United States Patent
Hümmer et al.

(10) Patent No.: US 10,603,990 B2
(45) Date of Patent: Mar. 31, 2020

(54) DOOR MODULE FOR A MOTOR VEHICLE DOOR

(71) Applicant: BROSE FAHRZEUGTEILE GMBH & CO. KOMMANDITGESELLSCHAFT, BAMBERG, Bamberg (DE)

(72) Inventors: Norman Hümmer, Ebensfeld (DE); Michael Jahn, Baunach (DE); Hans Herzog, Strullendorf (DE); Michael Thienel, Thurnau (DE); Gerhard Hofmann, Bamberg (DE); Matthias Fischer, Itzgrund (DE); André Lehnhardt, Eltmann (DE)

(73) Assignee: BROSE FAHRZEUGTEILE GMBH & CO. KOMMANDITGESELLSCHAFT, Bamberg (DE)

( * ) Notice: Subject to any disclaimer, the term of this patent is extended or adjusted under 35 U.S.C. 154(b) by 0 days.

(21) Appl. No.: 15/565,389

(22) PCT Filed: May 3, 2016

(86) PCT No.: PCT/EP2016/059904
§ 371 (c)(1),
(2) Date: Oct. 9, 2017

(87) PCT Pub. No.: WO2016/177738
PCT Pub. Date: Nov. 10, 2016

(65) Prior Publication Data
US 2018/0056760 A1 Mar. 1, 2018

(30) Foreign Application Priority Data

May 5, 2015 (DE) .................. 10 2015 005 885
Sep. 10, 2015 (DE) .................. 10 2015 217 349

(51) Int. Cl.
*E05F 15/00* (2015.01)
*B60J 5/04* (2006.01)
*B29C 45/16* (2006.01)

(52) U.S. Cl.
CPC .......... *B60J 5/0416* (2013.01); *B29C 45/1671* (2013.01); *B60J 5/0418* (2013.01);
(Continued)

(58) Field of Classification Search
CPC ...... B60J 5/0416; B60J 5/0418; B60J 5/0425; B60J 5/0455; B60J 5/0463; B60J 5/0426;
(Continued)

(56) References Cited

U.S. PATENT DOCUMENTS 5,190,803 A 3/1993 Goldbach et al.
5,251,403 A * 10/1993 Compeau ............... B60J 5/0416
49/348
(Continued)

FOREIGN PATENT DOCUMENTS

CN 124500 A 1/2000
CN 1243076 A 2/2000
(Continued)

OTHER PUBLICATIONS

European Examination Report cited in corresponding EP Application No. 16 720 417.1-1015 dated Dec. 18, 2018, 4 pages, with English Translation, 2 pages.
(Continued)

*Primary Examiner* — Chi Q Nguyen
(74) *Attorney, Agent, or Firm* — Lewis Roca Rothgerber Christie LLP

(57) ABSTRACT

It is provided a door module for a motor vehicle door, having a module carrier which is formed substantially by organic sheet, an attachment region of the module carrier, which is surrounded by a stamped protuberance of the organic sheet,
(Continued)

a window regulator drive, arranged in the attachment region, of a motor vehicle window regulator, and at least one flexible traction mechanism proceeding from the window regulator drive and coupled thereto, which traction mechanism extends along the module carrier. In the attachment region of the module carrier, a longitudinally extending stiffening region is formed, which is formed at least partially as a stamped protuberance of the organic sheet and which runs along the direction of extent of a section of the flexible traction mechanism.

19 Claims, 16 Drawing Sheets

(52) U.S. Cl.
CPC .......... *B60J 5/0425* (2013.01); *B60J 5/0426* (2013.01); *B60J 5/0455* (2013.01); *B60J 5/0463* (2013.01); *B60J 5/0481* (2013.01)

(58) Field of Classification Search
CPC ........ B60J 5/0481; B60J 5/0419; B60J 5/042; B60J 5/0423; E05Y 2900/531; B29K 2101/12; B29L 2031/3041
USPC ................ 49/349, 324, 502, 340, 344, 345; 296/146.2, 146.7, 146.5, 146.6
See application file for complete search history.

(56) References Cited

U.S. PATENT DOCUMENTS

| | | | |
|---|---|---|---|
| 6,594,955 B1* | 7/2003 | Delire | B60J 5/0416 49/502 |
| 6,874,279 B1 | 4/2005 | Weber et al. | |
| 7,992,347 B2* | 8/2011 | Roy | B60J 5/0413 296/146.7 |
| 2003/0188492 A1 | 10/2003 | Bonnett et al. | |
| 2003/0218356 A1 | 11/2003 | Emerling et al. | |
| 2004/0049989 A1 | 3/2004 | Florentin et al. | |
| 2005/0200159 A1 | 9/2005 | Eckhart et al. | |
| 2006/0283091 A1* | 12/2006 | Papi | B60J 5/0416 49/502 |
| 2007/0062123 A1 | 3/2007 | Kruger et al. | |
| 2007/0251149 A1* | 11/2007 | Kirejczyk | E05F 11/483 49/352 |
| 2007/0296245 A1* | 12/2007 | Kriese | E05F 11/488 296/155 |
| 2008/0116722 A1* | 5/2008 | Garcia Martin | B60J 5/0416 296/208 |
| 2010/0084887 A1 | 4/2010 | Kruger et al. | |
| 2010/0084888 A1 | 4/2010 | Ishitobi et al. | |
| 2011/0023367 A1* | 2/2011 | Barr | B60J 5/0416 49/349 |
| 2011/0078957 A1 | 4/2011 | Deschner | |
| 2012/0036780 A1 | 2/2012 | Pleiss et al. | |
| 2012/0241999 A1 | 9/2012 | Kroner | |
| 2013/0057018 A1 | 3/2013 | Reese | |
| 2014/0361576 A1 | 12/2014 | Storgato et al. | |
| 2015/0047264 A1 | 2/2015 | Kobayashi | |
| 2016/0056511 A1 | 2/2016 | Schmid et al. | |
| 2016/0136870 A1 | 5/2016 | Thienel et al. | |
| 2018/0001749 A1* | 1/2018 | Costigan | B60J 5/0411 |

FOREIGN PATENT DOCUMENTS

| | | |
|---|---|---|
| CN | 1424958 A | 6/2003 |
| CN | 1659051 A | 8/2005 |
| CN | 104169115 A | 11/2014 |
| CN | 105377523 A | 3/2016 |
| DE | 29808833 U1 | 8/1998 |
| DE | 19804781 A1 | 8/1999 |
| DE | 199 44 916 A1 | 3/2001 |
| DE | 10052739 A1 | 5/2002 |
| DE | 10133421 A1 | 1/2003 |
| DE | 102005033115 A1 | 1/2007 |
| DE | 102006037157 A1 | 3/2007 |
| DE | 102006002436 A1 | 7/2007 |
| DE | 102006017424 A1 | 10/2007 |
| DE | 202006018071 U1 | 5/2008 |
| DE | 102008024742 A1 | 11/2009 |
| DE | 102009039498 A1 | 1/2011 |
| DE | 102009040901 A1 | 3/2011 |
| DE | 102010014510 A1 | 10/2011 |
| DE | 102010053381 A1 | 6/2012 |
| DE | 102012023588 A1 | 7/2013 |
| DE | 102013001943 A1 | 3/2014 |
| DE | 202012104145 U1 | 3/2014 |
| DE | 102013210094 A1 | 10/2014 |
| DE | 102013213711 A1 | 1/2015 |
| EP | 0 370 342 A2 | 5/1990 |
| EP | 1 275 540 B1 | 1/2003 |
| EP | 1 486 366 A2 | 12/2004 |
| EP | 0 955 191 B1 | 4/2005 |
| EP | 2 272 706 B1 | 1/2011 |
| JP | 7-13535 | 3/1995 |
| JP | 2001-503696 | 3/2001 |
| JP | 2008-254471 | 10/2008 |
| JP | 2012-520198 | 9/2012 |
| JP | 2013-107521 A | 6/2013 |
| JP | 2014-184765 A | 10/2014 |
| JP | 2015-209146 A | 11/2015 |
| JP | 2009-154580 A | 7/2016 |
| JP | 2016-153235 | 8/2016 |
| WO | WO 99/39931 | 8/1999 |
| WO | WO 99/59833 | 11/1999 |
| WO | WO 01/39952 A1 | 6/2001 |
| WO | WO 2008/061906 A2 | 5/2008 |
| WO | WO 2010/135562 A2 | 11/2010 |

OTHER PUBLICATIONS

Japanese Decision of Grant for Japanese Application No. 2017-557446 dated Apr. 9, 2019, 3 pages.
Japanese Decision of Grant for Japanese Application No. 2017-557448 dated Apr. 16, 2019, 3 pages.
Japanese Decision of Grant for Japanese Application No. 2017-557449 dated Apr. 16, 2019, 3 pages.
CN Office action dated Nov. 28, 2019 cited in corresponding CN Application No. 201680026362.5, 6 pages, with English translation, 2 pages.
CN Office action dated Dec. 2, 2019 cited in corresponding CN Application No. 201680026352.1, 8 pages, with English translation, 4 pages.
CN Office action dated Jan. 6, 2020 cited in corresponding CN Application No. 201680025997.3, 8 pages, with English translation, 2 pages.

* cited by examiner

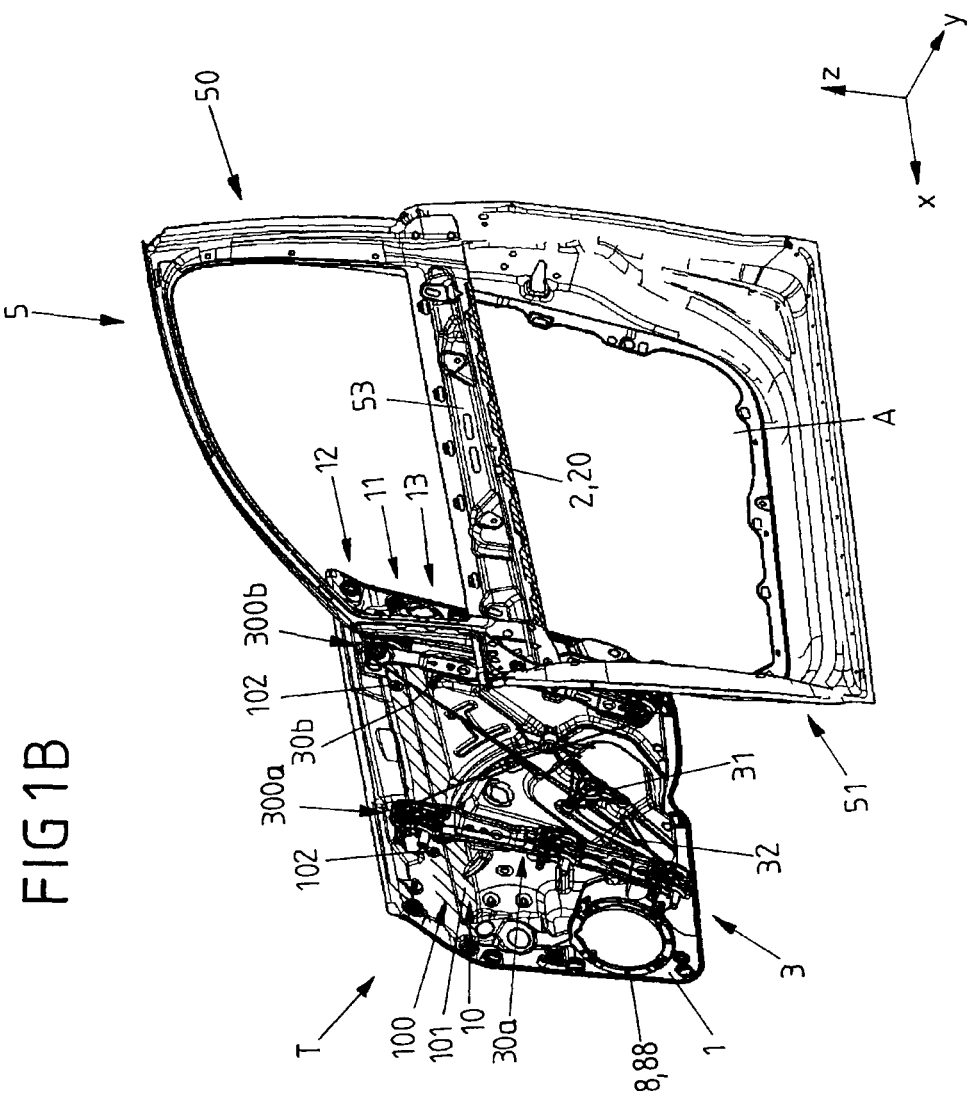

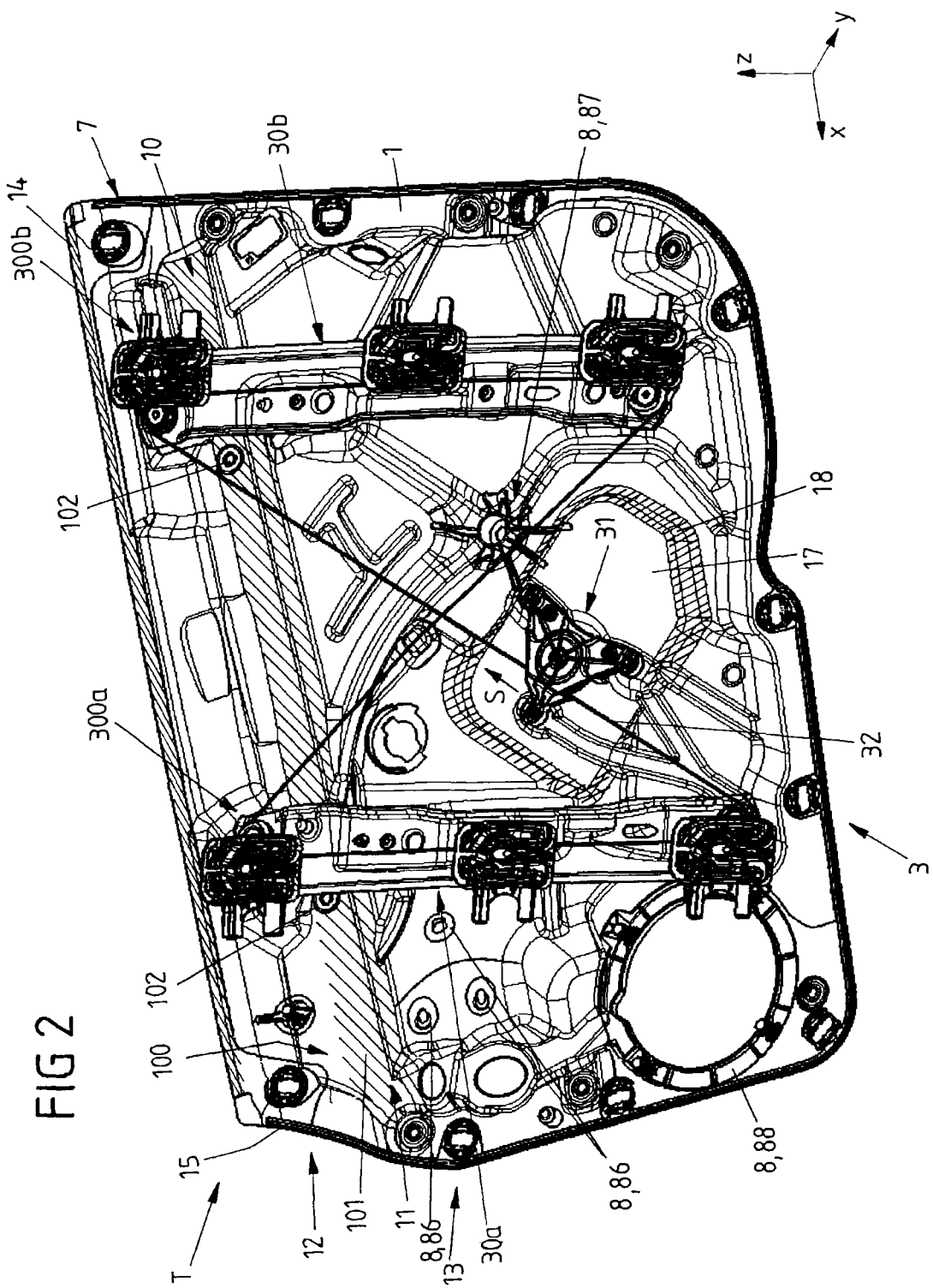

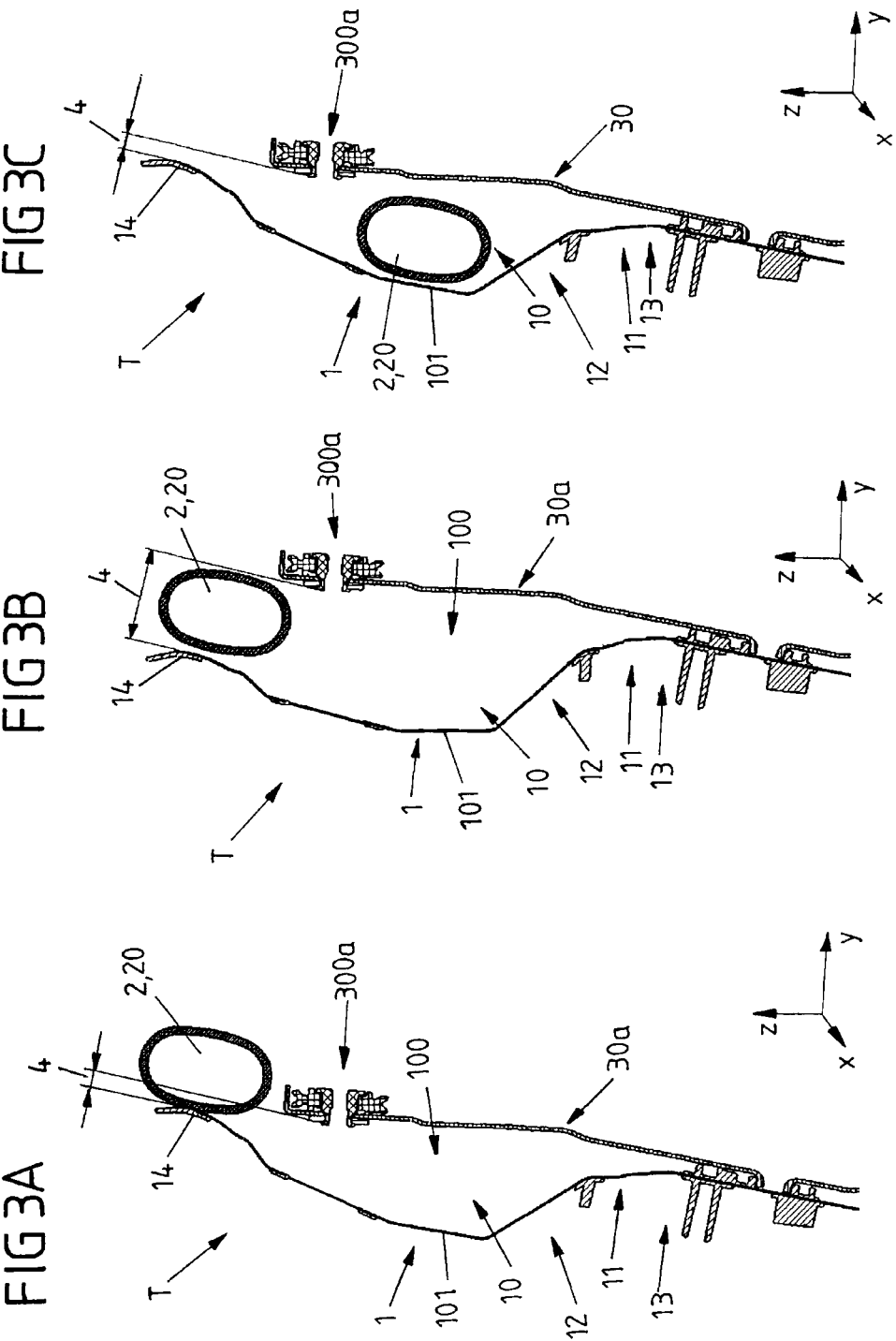

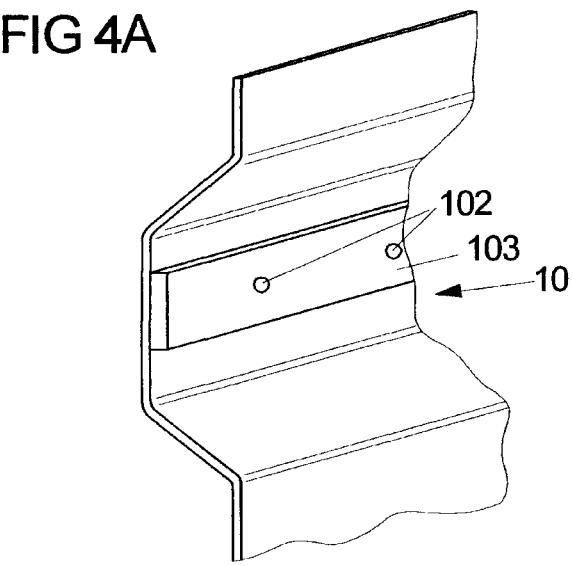
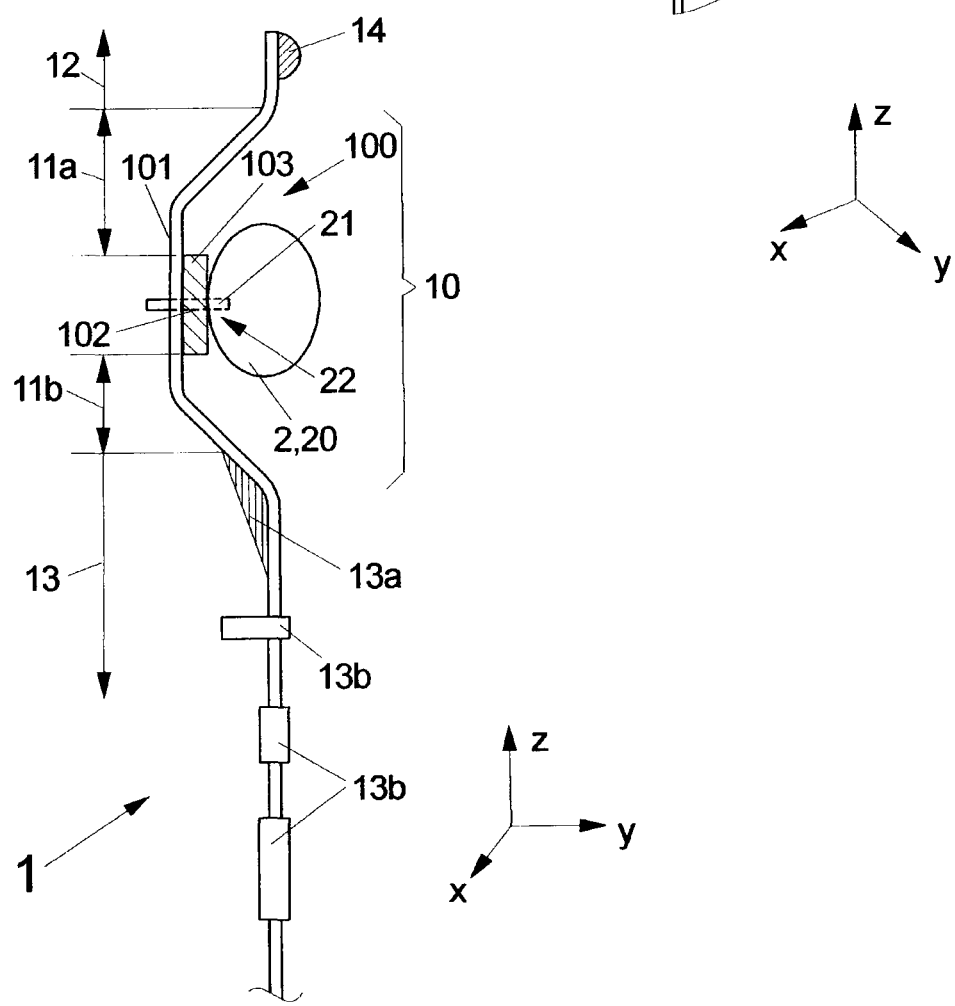

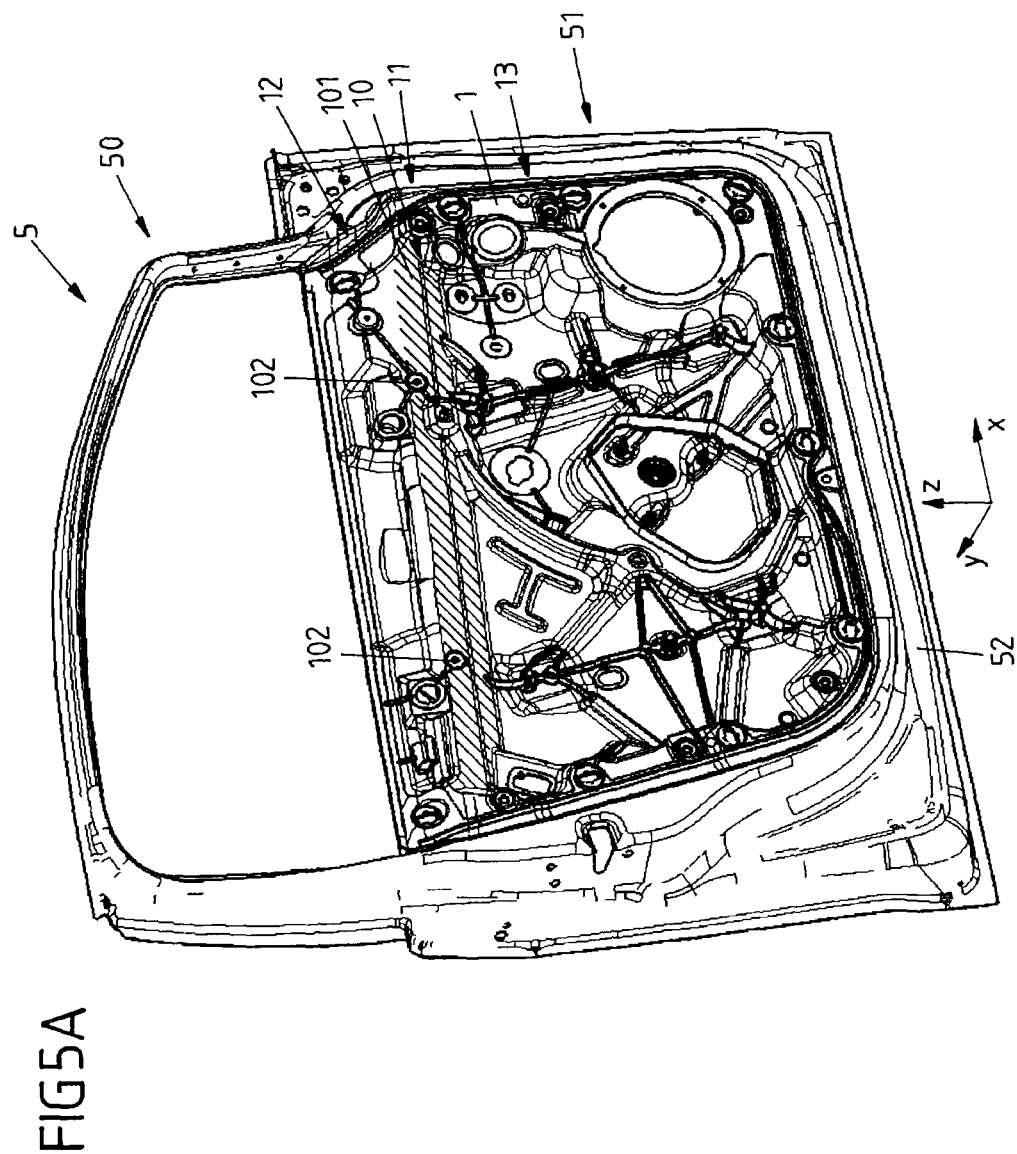

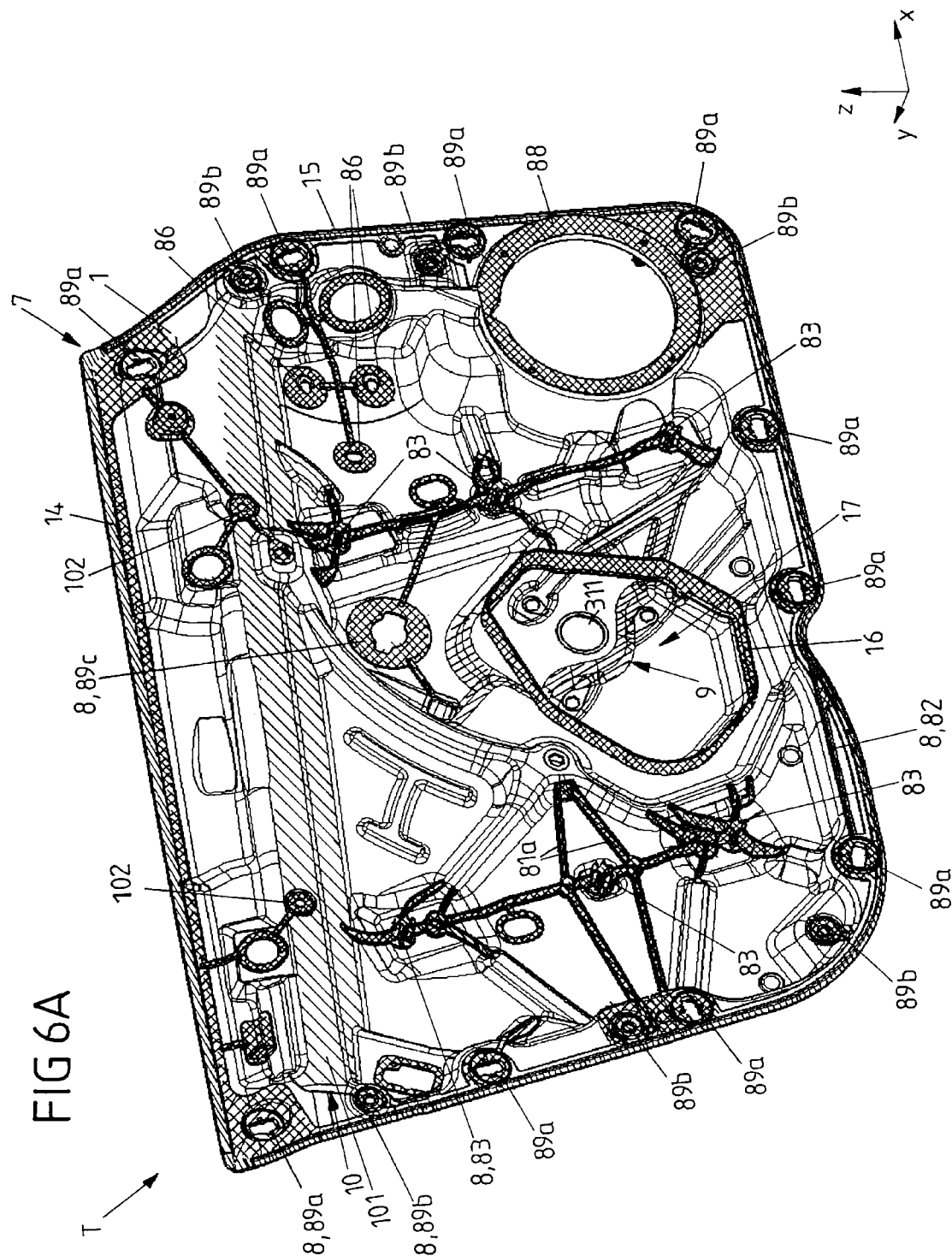

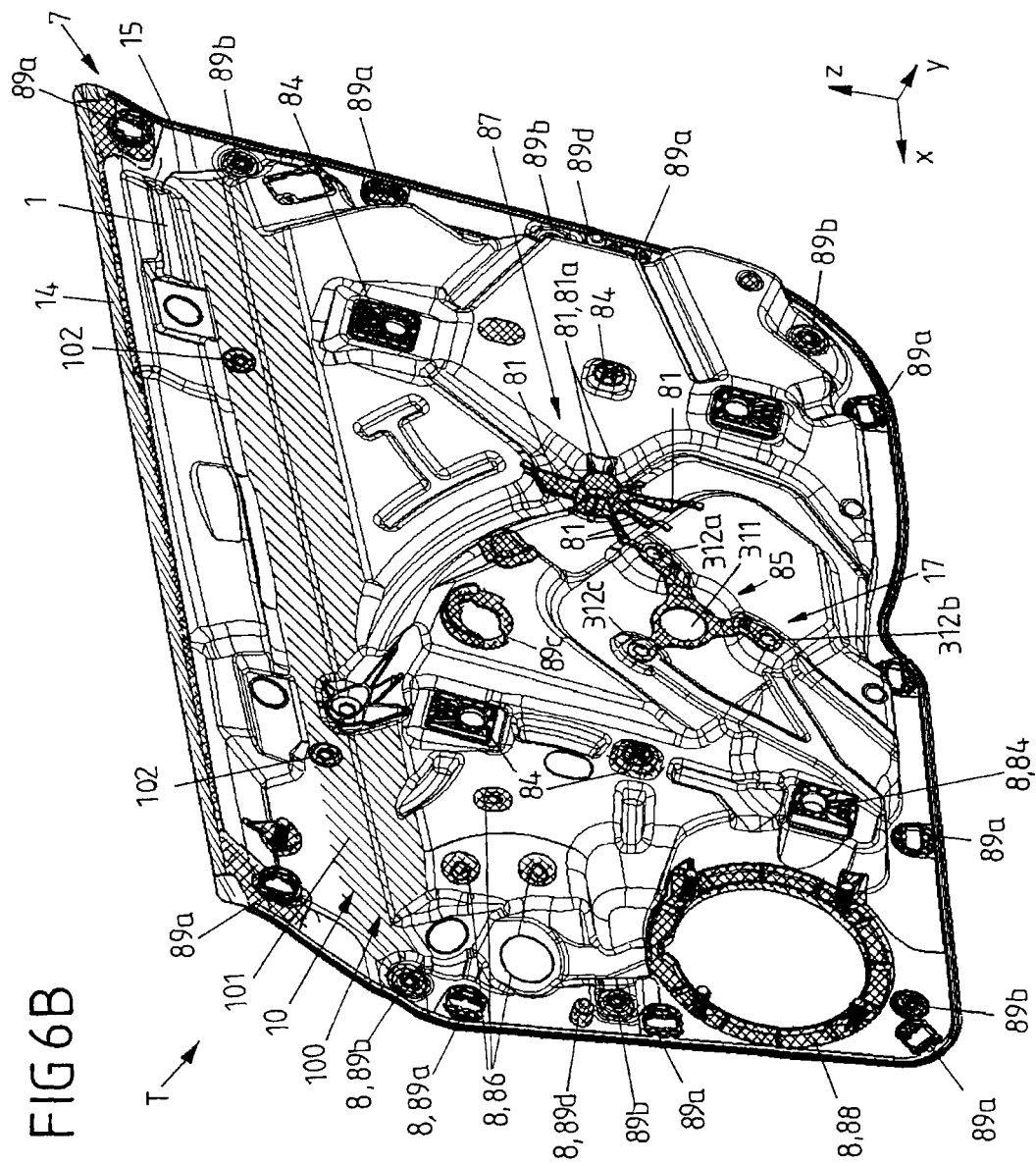

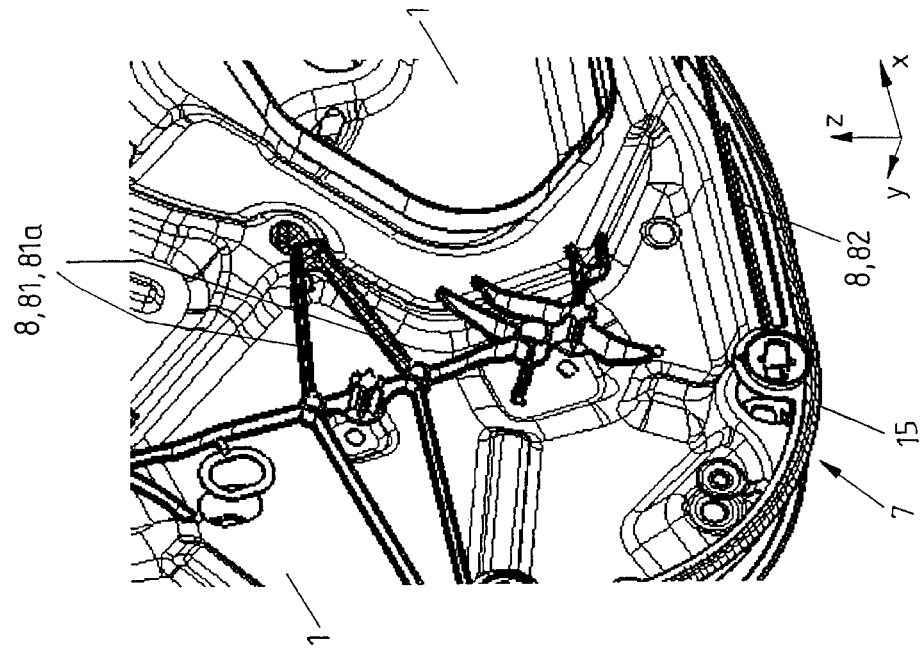
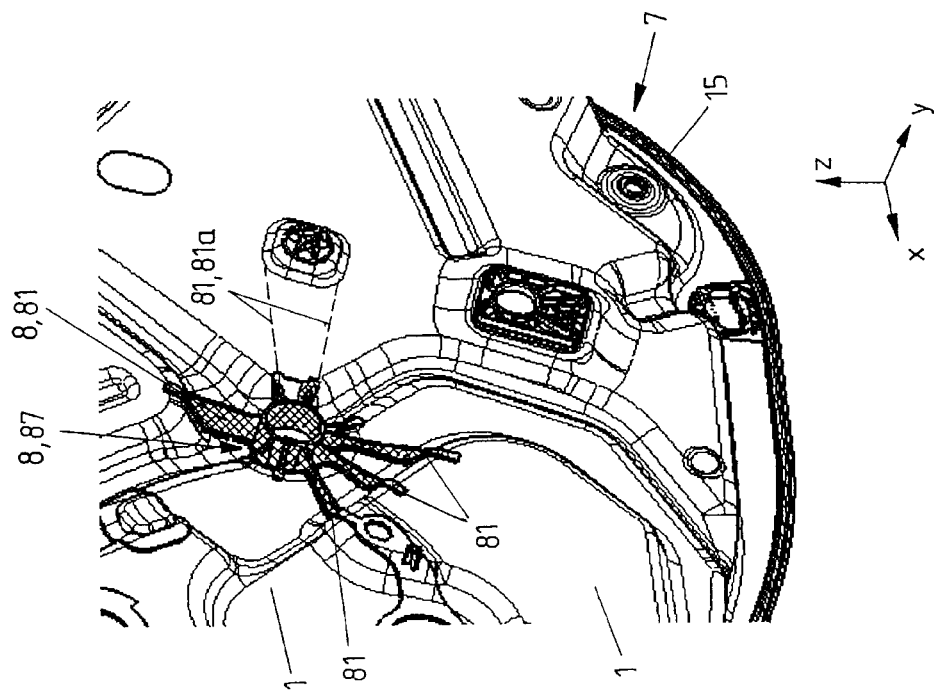

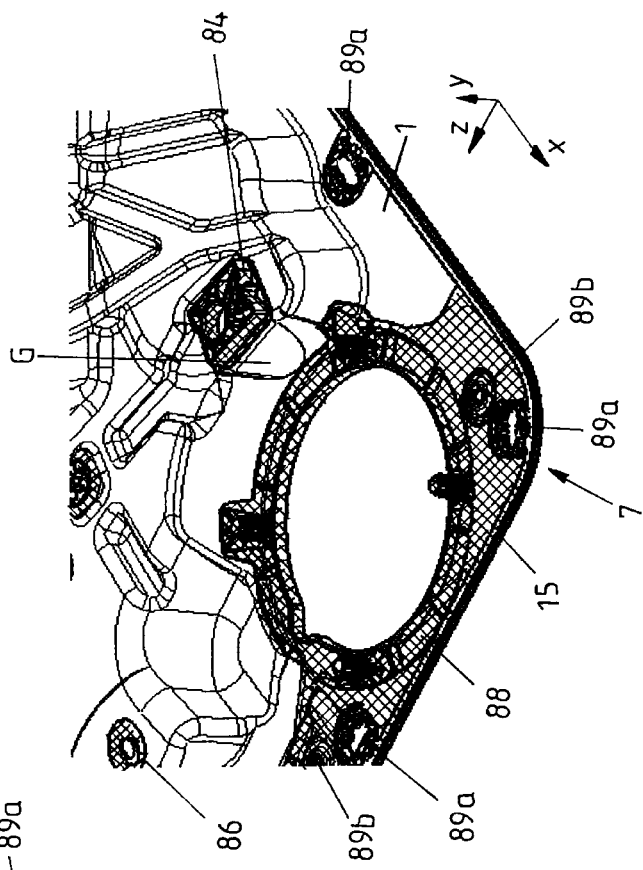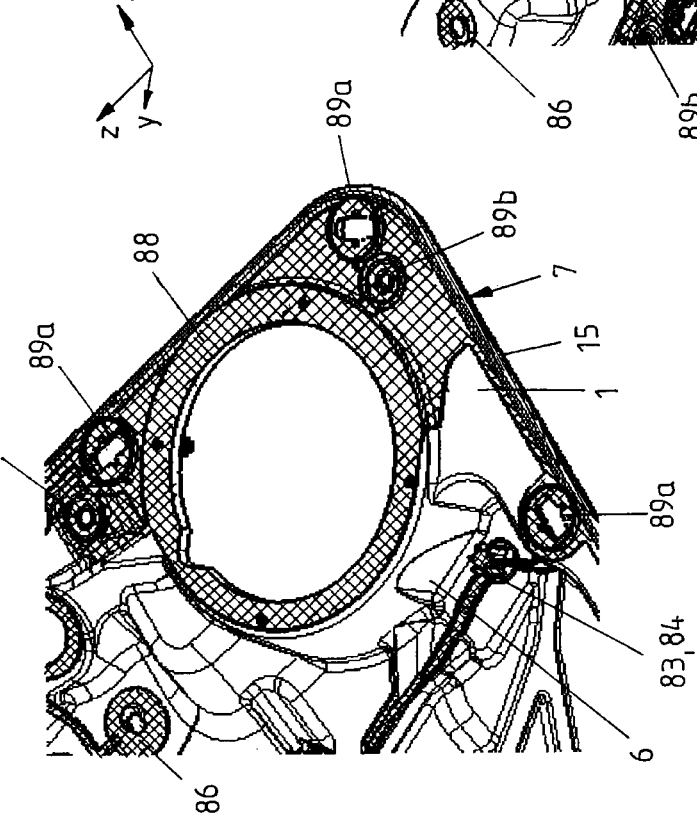

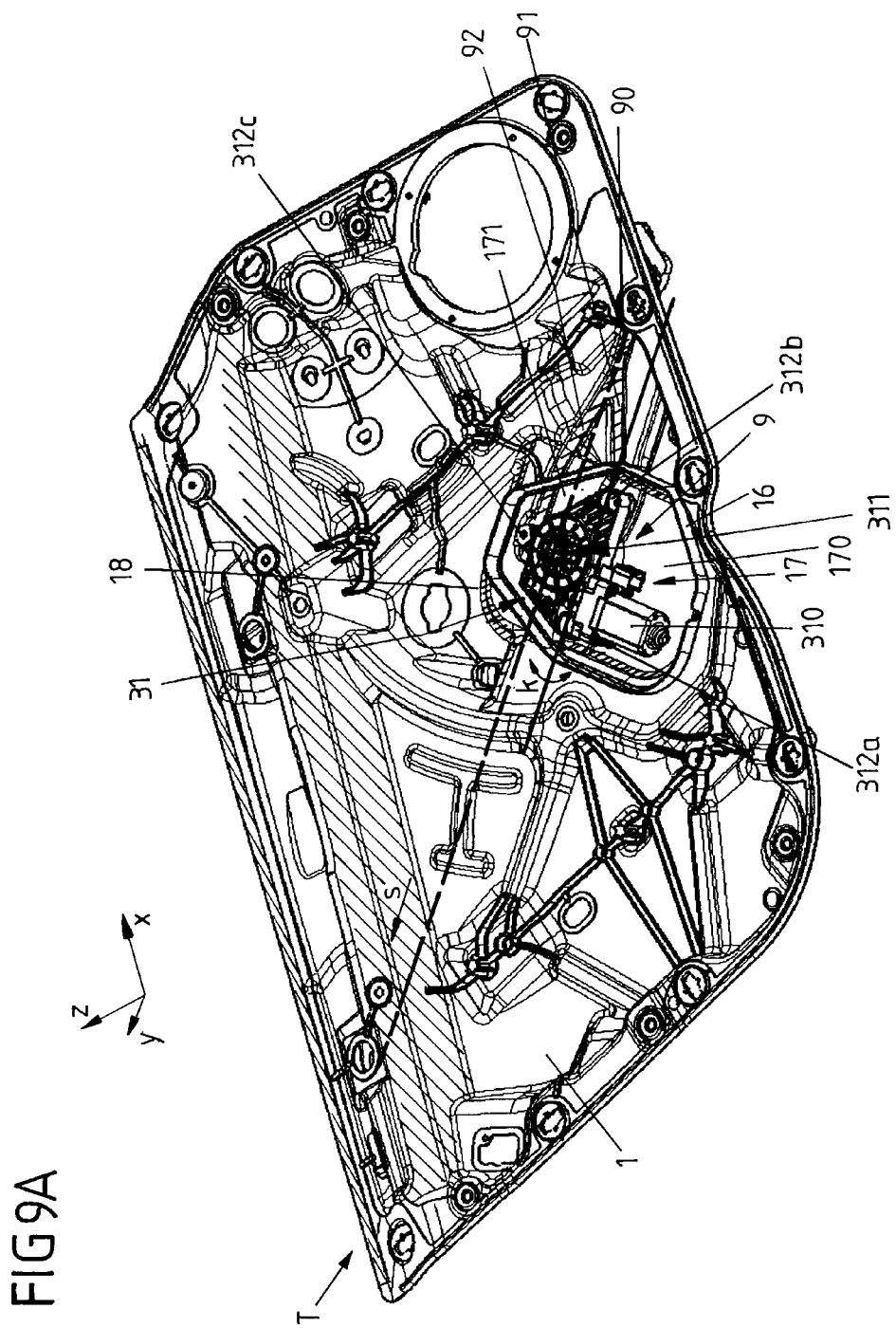

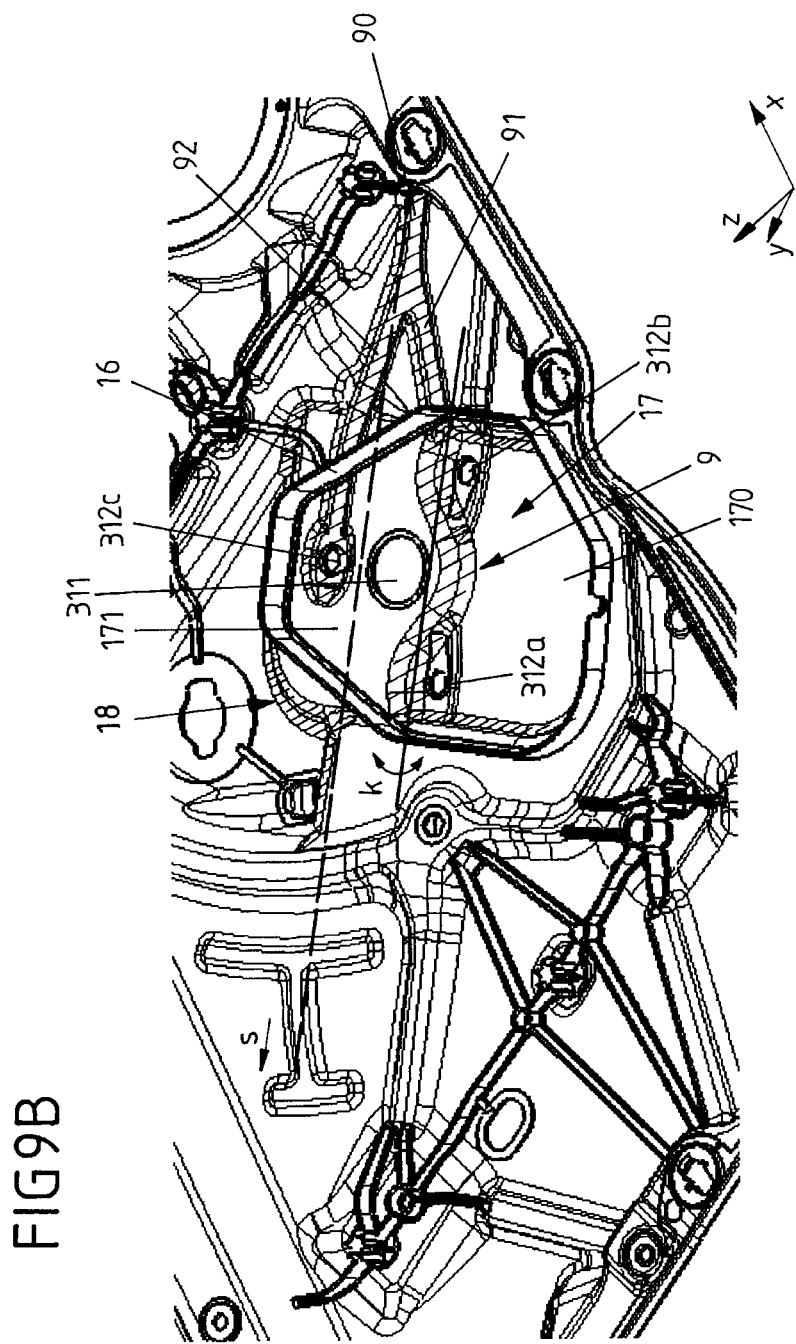

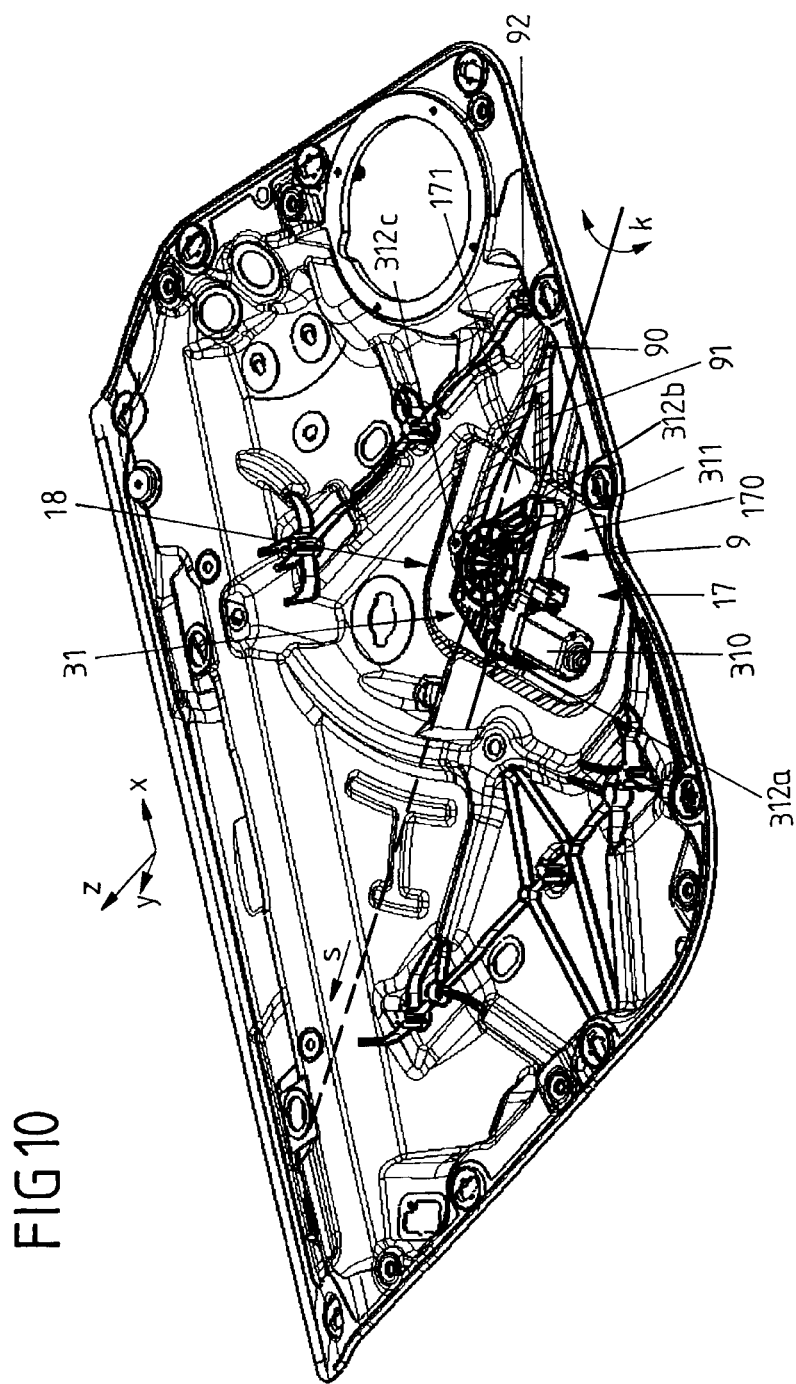

DOOR MODULE FOR A MOTOR VEHICLE DOOR

CROSS-REFERENCE TO A RELATED APPLICATION

This application is a National Phase patent application of International Patent Application Number PCT/EP2016/059904, filed on May 3, 2016, which claims priority of German Patent Application Number 10 2015 005 885.1, filed on May 5, 2015 and of German Patent Application Number 10 2015 217 349.6, filed on Sep. 10, 2015, the contents of all of which are incorporated herein by reference.

BACKGROUND

The present invention relates to a door module.

A door module of said type of a motor vehicle door comprises a module carrier which is formed substantially by organic sheet, and an attachment region of the module carrier, which is surrounded by a stamped protuberance of the organic sheet. Furthermore, the door module comprises a window regulator drive of a motor vehicle window regulator, which window regulator drive is arranged in the attachment region, and at least one flexible traction mechanism which proceeds from the window regulator drive and is coupled thereto. The flexible traction mechanism extends in this case along the module carrier.

The fact that the module carrier is formed substantially by organic sheet means in this case that the organic sheet forms that part of the module carrier which is subjected to the major part of the forces that act under normal operating conditions. This may be in particular that part of the module carrier on which one or more guide rails of a window regulator are provided. A (coherent) part (which for example bears one or more guide rails) of the module carrier composed of organic sheet, or multiple parts (which for example bear one or more guide rails) of the module carrier composed of organic sheet extend for example over approximately 30% or more of the area of the module carrier. In particular, the organic sheet may extend over more than 40% and generally over at least 50% of the area of the module carrier, such that the organic sheet thus also makes up a corresponding fraction of more than 40% or approximately 50% or more of the surface of the module carrier. To fully utilize the strength advantages of the organic sheet, it is generally sought to maximize the fraction of the area of the module carrier made up by the organic sheet. A multi-part form of the organic sheet on a module carrier is not ruled out here.

A main constituent part of the module carrier is for example a panel-like semifinished part, which is composed of an organic sheet. The organic sheet involves a thermoplastics material reinforced with endless fibers, wherein the endless fibers are embedded in the form of lays, wovens or knits composed of glass fibers, Kevlar fibers, carbon fibers or plastics fibers into a thermoplastics matrix. A suitable thermoplastics material for the matrix is for example polyamide owing to its good adhesion characteristics with respect to the fibers.

The characterization "reinforced with endless fibers" is to be understood to mean that the length of the fibers used for the reinforcement is limited substantially by the size of the panel-like organic sheet. Generally, a fiber has no discontinuities within the organic sheet.

Thus, organic sheet forms a main constituent part of the module carrier though may in this case be supplemented by further components or materials. For example, metallic elements and/or plastics elements may be incorporated into the organic sheet or attached to the organic sheet.

Door modules which comprise a module carrier and a window regulator drive, which is arranged on the module carrier, are known from the prior art. These arrangements are aimed at achieving transmission of force from the window regulator drive to the flexible traction mechanism that is as good as possible.

SUMMARY

The invention is based on the problem of providing a door module of the type mentioned in the introduction, in the case of which the window regulator drive is arranged on the module carrier such that transmission of force from the window regulator drive to the flexible traction mechanism takes place and drive noises of the window regulator drive are damped.

Said problem is solved according to the invention through the provision of a door module having features as described herein.

According thereto, in the attachment region of the module carrier, an elongate stiffening region is formed, which is formed at least partially by a stamped protuberance of the organic sheet. The longitudinally extending stamped protuberance of the organic sheet is in this case formed such that it creates, along its direction of extent, a stiffening in the organic sheet. The stiffening region has greater stiffness than adjacent regions of the module carrier; and the stiffening region runs along the direction of extent of a section of the flexible traction mechanism which is coupled to the window regulator drive.

The flexible traction mechanism can in this case extend, in one embodiment, substantially in a plane which runs parallel to a plane of extent of the module carrier.

The stiffening region defines a tilt axis which promotes tilting of the window regulator drive about the tilt axis (whereas tilting of the window regulator drive along that axis is made more difficult). As a result, oscillations of the window regulator drive about the tilt axis are enabled in a targeted manner, in order to reduce drive noises of the window regulator drive.

In an advantageous refinement, the stiffening region can be arranged on the side of the module carrier on which the window regulator drive is also fixed to the module carrier. In a further design variant, the longitudinally extending stiffening region can be formed on the module carrier on the side which faces away from the window regulator drive. In a further embodiment, the stiffening region is formed at least in sections on both sides of the module carrier.

In this case, the stiffening region can be formed at least partially by a thermoplastics molded-on portion. The molded-on portion can in particular be reinforced with fibers. As a result of the molded-on portion, a region with increased material quantity is formed on the organic sheet, whereby the stiffness of the module carrier is increased in this region, along the direction of extent of the molded-on portion. By means of fiber reinforcement, the stiffness of the stiffening region can be increased further.

In one development, the stiffening region has a rib-like structure, which gives the stiffening region additional stability and/or stiffness.

The stiffening region extends in particular substantially parallel to the direction of extent of a section of the flexible traction means which proceeds from the window regulator drive.

Specifically, the stiffening region can extend between two sides of the stamped protuberance which surrounds the attachment region. The two sides can be opposite sides of the stamped protuberance. In particular, these can run substantially perpendicular to the direction of extent of the cable section proceeding from the window regulator drive.

Furthermore, provision can be made for the stiffening region to separate two planes of the attachment region from one another. These two planes can be spaced apart from one another, for example—in relation to the intended installed state of the door module in the motor vehicle door—along the horizontal vehicle transverse direction.

Advantageously, an opening in the organic sheet of the module carrier, which opening enables a drive shaft of the window regulator drive to extend through the module carrier, can be arranged in the region of the first plane. According to one embodiment, a drive motor of the window regulator drive can be located in the region of the second plane and the drive shaft of the window regulator drive can extend through the opening in the first plane. In the case of such an arrangement, the drive motor and the drive shaft of the window regulator drive are accordingly arranged with respect to one another such that the stiffening region runs substantially between these two planes.

In one development, the stiffening region follows an outer edge of the opening in the module carrier, at least in sections, through which opening the drive shaft of the window regulator drive can extend through the module carrier. The profile of the stiffening region is therefore adapted in sections to the contour of the opening in the module carrier.

According to a further aspect of the invention, the stiffening region can continue outside the attachment region. The stiffening region can therefore extend both within the attachment region and (adjoining the latter) outside the attachment region.

According to one embodiment of the invention, the stiffening region is formed in a Y-shaped manner. Accordingly, the stiffening region has a base and two limbs proceeding therefrom. In this case, the base runs along the direction of extent of a section of the flexible traction mechanism which proceeds from the window regulator drive. The base is in this case arranged at least partially outside the attachment region. At least the first limb of the Y-shaped stiffening region also extends within the attachment region. According to one variant, the first limb of the Y-shaped stiffening region also extends along the direction of extent of said section of the flexible traction mechanism.

Furthermore, the second limb of the Y-shaped stiffening region can also run within the attachment region. For example, the first and/or the second limb of the Y-shaped stiffening region can extend at least partially within and outside the attachment region.

According to one embodiment, the stiffening region is formed such that it creates stiffening in the direction which extends substantially along the direction of extent of said section of the flexible traction mechanism. The window regulator drive can be connected to the module carrier in the attachment region such that a drive motor of the window regulator drive can oscillate about a tilt axis which runs substantially along the direction of extent of the stiffening region.

Furthermore, a sound-insulating wall can be arranged on the organic sheet of the module carrier, said sound-insulating wall substantially enclosing the attachment region. Such a sound-insulating wall can serve to reduce the airborne noise created by drive motor of the window regulator drive. For example, the sound-insulating wall can be mounted on the contour of the attachment region such that it is connected to the module carrier in a positively locking and/or cohesive fashion and borders the attachment region, i.e. runs around the outer contour of the attachment region (in an open or closed manner). In a further development, the sound-insulating wall can have a lamellar structure, whereby an insulating material can be fixed in the sound-insulating wall.

In a further embodiment, a cover can be mounted on the sound-insulating wall in order to achieve a further reduction in the airborne noise created by the drive motor of the window regulator drive.

BRIEF DESCRIPTION OF THE DRAWINGS

Further advantages and details of the invention will be discussed in the following description of exemplary embodiments on the basis of the figures.

FIG. 1B shows the outer side of the arrangement from FIG. 1A with additional functional elements fixed to the module carrier.

FIG. 2 shows an enlarged illustration of the outer side of the door module from FIG. 1B.

FIGS. 3A to 3C show steps during the assembly of the door structure and of the door module from FIGS. 1A, 1B and 2 in cross section, wherein a reinforcement element of the door structure is received in a channel of the door module.

FIG. 4A shows a perspective view of an exemplary embodiment of a module carrier and in particular of a bending region of the module carrier.

FIGS. 4B and 4C show cross-sectional illustrations of further exemplary embodiments of a module carrier and in particular of a respective bending region.

FIG. 5A shows the inner side of a door structure and of a door module fixed in the intended manner to the door structure, in a view as per FIG. 1A.

FIG. 6A shows the inner side of the door module from FIG. 1A, wherein a thermoplastics encapsulation and multiple thermoplastics molded-on portions are emphasized in the illustration.

FIG. 6B shows the outer side of the door module from FIG. 6A, wherein, in this figure also, the encapsulation and the molded-on portions are emphasized in the illustration.

FIGS. 7A and 7B show in each case an enlarged illustration of the outer side and of the inner side of a region of the door module from FIGS. 6A and 6B in which a molded-on portion for the fixing of a door pull-closed handle is arranged.

FIGS. 8A and 8B show in each case an enlarged illustration of the inner side and of the outer side of a region of the door module from FIGS. 6A and 6B in which a molded-on portion for the fixing of a loudspeaker is arranged.

FIG. 9A shows the inner side of a door module, in a view as per FIGS. 1A, 5A and 6A, with a window regulator drive additionally fixed to the module carrier.

FIG. 9B shows an enlarged illustration of a region of the door module from FIG. 9A, without the window regulator drive.

FIG. 10 shows the inner side of a variant of the embodiment of a door module illustrated in FIG. 9A.

DETAILED DESCRIPTION

Figure 1A:
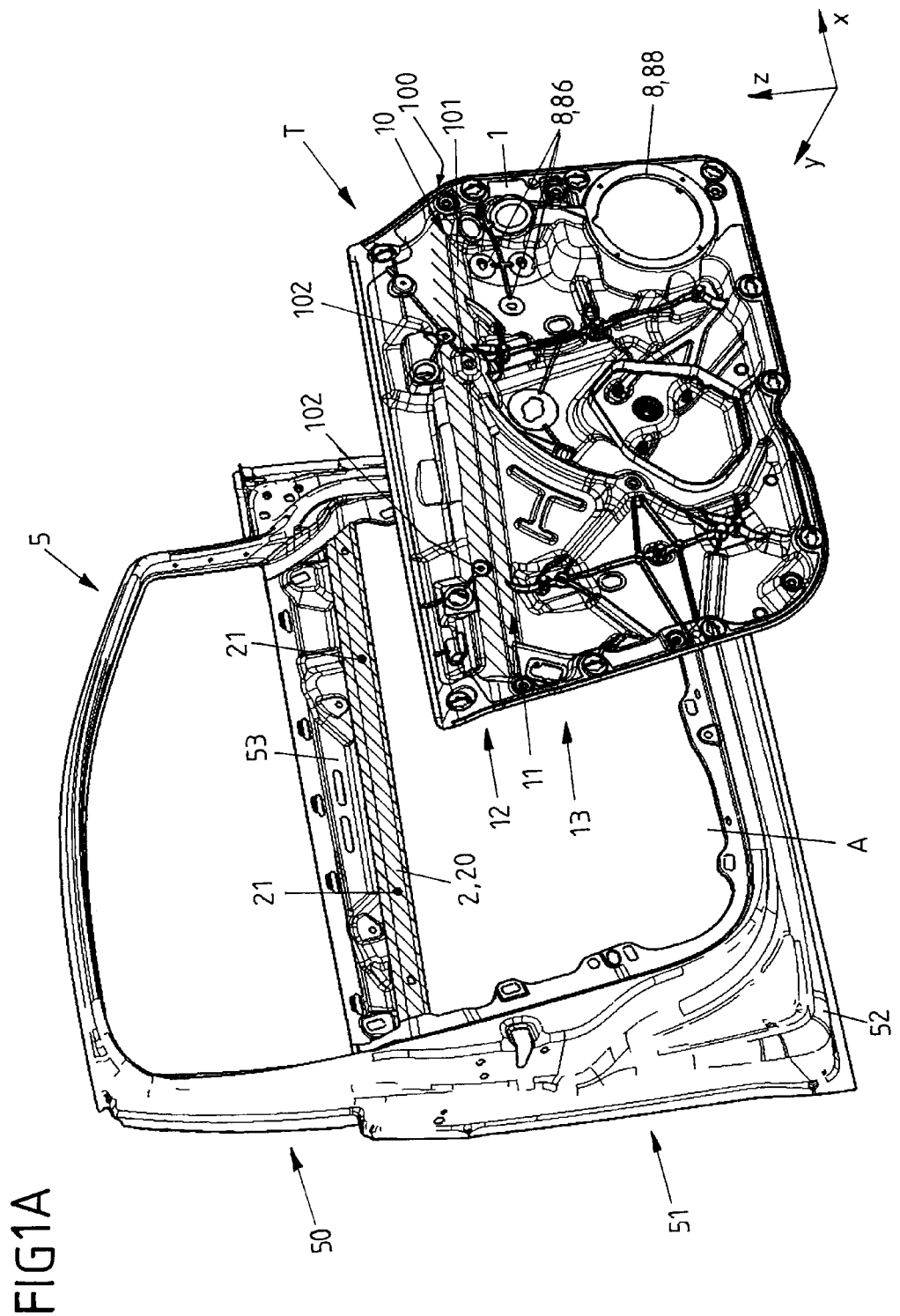
FIG. 1A shows the inner side of a door structure of a motor vehicle and of a module carrier of an associated door module.

FIGS. 1A and 1B illustrate major elements of a motor vehicle door, including a door module T and a door structure 5. The door module T is designed for being fixed to the door structure 5. The door module T in this case comprises a module carrier 1 on which functional elements of the door module T can be mounted, specifically in particular before the door module T has been fixed to the door structure 5, as shown in FIGS. 1A and 1B.

In an intended installation situation of a motor vehicle door in a motor vehicle, said motor vehicle door, like the door structure 5 and the door module T as components of the motor vehicle door, has an inner side and an outer side. The inner side faces toward the interior space of the motor vehicle, and the outer side faces toward a region outside the motor vehicle.

It is furthermore possible, in relation to the intended installation situation of the motor vehicle door in the motor vehicle, to define a coordinate system for the motor vehicle door and the elements thereof. Here, the vehicle longitudinal axis x extends from a rear side of the motor vehicle to the front side thereof, that is to say along the direction of forward travel. The (horizontal) vehicle transverse axis y extends perpendicular to the vehicle longitudinal axis x between two opposite motor vehicle doors of the motor vehicle. The vehicle vertical axis z is defined in that it stands both perpendicular to the vehicle longitudinal axis x and to the vehicle transverse axis y. The vehicle vertical axis z extends from the floor of the motor vehicle toward the roof thereof.

FIG. 1A illustrates, in the present case, the inner sides of the door structure 5 and of the door module T, and FIG. 1B shows the outer side of the arrangement from FIG. 1A, but with additional functional elements that are not shown in FIG. 1A.

The door structure 5 comprises a window frame structure 50 and a door case 51. The window frame structure 50 and the door case 51 are, in the embodiment illustrated here, formed by a door inner panel 52. Alternatively, they may be formed for example by a plastics element or a composite material.

A breast delimitation 53 separates the window frame structure 50 from the door case 51. The breast delimitation 53 extends along the vehicle longitudinal axis x between the front side and the rear side of the door structure 5. The breast delimitation 53 may be formed for example as a stamped sheet part.

The door case 51 and the breast delimitation 53 surround an aperture A in the door structure 5. In the case of an intended fixing of the door module T to the door structure 5, the aperture A is covered by the door module T. In this way, the door module T together with the door structure 5 separates a wet space from a dry space of the motor vehicle door, in a known manner.

The dry space is situated in front of the inner side of the door module T, and the wet space is situated in front of the outer side of the door module T. In particular, elements of a motor vehicle door which are not sensitive to moisture are arranged in the region of the wet space. Also, in particular, elements of a motor vehicle door which are sensitive to moisture are arranged in the region of the dry space.

The door structure 5 furthermore comprises a reinforcement element 2. Said reinforcement element is in this case a rectilinear tube 20. The reinforcement element 2 may alternatively be formed for example as a stamped sheet part, as an open profile element, or as an integral constituent part of the door inner panel 52.

The reinforcement element 2 (in the form of the tube 20) extends on the door structure 5 substantially along the vehicle longitudinal axis x. Said reinforcement element is arranged, along the vehicle vertical axis z, below the window frame structure 50, and here, at least partially adjoins the breast delimitation 53. Along the vehicle transverse axis y, the reinforcement element 2 is, on the inner side of the door structure 5, positioned at least in sections in front of the breast delimitation 53. Therefore, on the outer side of the door structure 5, only a lower edge of the reinforcement element 2 is visible, because it is for the most part concealed by the breast delimitation 53.

In further embodiments, the reinforcement element 2 may deviate from a rectilinear profile along its direction of extent. The reinforcement element 2 may for example have a curved profile along its direction of extent.

The reinforcement element 2 has connecting interfaces 21, which are designed for the fixing of the module carrier 1 to the reinforcement element 2. The embodiment of the reinforcement element 2 illustrated here has, specifically, two connecting interfaces 21, which are spaced apart from one another along the vehicle longitudinal axis x.

The module carrier 1 of the door module T is formed substantially from organic sheet. The organic sheet thus forms a main constituent part of the module carrier 1. Here, the module carrier 1 extends substantially along the x-z plane (as the main plane of the door module T).

Here, organic sheet refers to a panel-like semifinished part composed of a thermoplastics material reinforced with endless fibers, wherein the endless fibers are embedded in the form of lays, wovens or knits composed of glass fibers, Kevlar fibers, carbon fibers or plastics fibers into a thermoplastics matrix. A suitable thermoplastics material for the matrix is for example polyamide owing to its good adhesion characteristics with respect to the fibers.

The expression "reinforced with endless fibers" is to be understood to mean that the length of the fibers used for the reinforcement is limited substantially by the size of the panel-like organic sheet. Generally, a fiber has no discontinuities within the organic sheet.

The organic sheet of the module carrier 1 is surrounded by an outer edge 15. The outer edge 15 is encased with a thermoplastics encapsulation 7. That is to say, the outer edge 15 is engaged around, in cross section, by the encapsulation 15. The encapsulation 7 may form in particular a seal element 14. The encapsulation 7 may however also form a seal receptacle in which a seal element can be received. The seal element 14 is for example arranged on the upper edge of the module carrier 1, and extends there along the vehicle longitudinal axis x. The seal element 14 advantageously has sliding characteristics which enable the module carrier 1 to slide along further elements of a motor vehicle door.

The module carrier 1 furthermore comprises interfaces for functional elements to be fixed to the module carrier 1, such as for example reinforcement elements, stiffening elements, seal elements, sound-insulating walls, elements of a motor vehicle window regulator, elements of a door structure, a door control unit, a door pull-closed handle, loudspeakers, a door inner lining, a door inner panel and/or a door outer panel.

In particular, elements of a motor vehicle window regulator 3 are fixed to the module carrier 1 on the outer side, illustrated in FIGS. 1B and 2, of the door module T. These include two guide rails 30a and 30b, a window regulator drive 31, and a flexible traction mechanism 32, which is coupled to the window regulator drive 31. The guide rails 30a and 30b extend substantially along the vehicle vertical axis z and are spaced apart from one another along the vehicle longitudinal axis x.

The guide rails 30a, 30b extend along the vehicle vertical axis z along approximately the entire extent of the module carrier 1. Here, they cross a longitudinally extending channel 10 which is formed integrally in the organic sheet of the module carrier 1. In further embodiments, it is for example also possible for only one guide rail 30a, 30b to cross the channel 10. The guide rails 30a and 30b have in each case a head 300a and 300b which, along the vehicle vertical axis z, is arranged above the channel 10.

Between the two guide rails 30a and 30b there is arranged a window regulator drive 31, which is coupled to the flexible traction mechanism 32. A local direction of extent s of a section of the flexible traction mechanism 32 proceeding from the window regulator drive 31 is thus defined. The flexible traction mechanism 32 may be formed for example as a cable.

The window regulator drive 31 is arranged in an attachment region 17 of the organic sheet of the module carrier 1. The attachment region 17 is surrounded by a stamped protuberance 18 of the organic sheet of the module carrier 1.

The channel 10 which is crossed by the guide rails 30a, 30b extends (substantially rectilinearly) along the vehicle longitudinal axis x (and along virtually the entire extent of the module carrier 1). Viewed along the vehicle vertical axis z, the channel 10 is arranged in the upper third of the module carrier 1.

The channel 10 is in this case formed such that it can receive the associated reinforcement element 2. For this purpose, the shape and direction of extent of the channel 10 on the one hand and of the reinforcement element 2 on the other hand are adapted to one another. Like the reinforcement element 2, the channel 10 may, in further embodiments, deviate from a rectilinear profile. Said channel may for example have a curved profile along its direction of extent.

The channel 10 has an insertion opening 100 which, in the present case, is situated on the outer side of the module carrier 1. The insertion opening 100 runs along the direction of extent of the channel 10, for example over the entire extent thereof. The insertion opening 100 is designed to enable the reinforcement element 2 to be inserted into the channel 10 in order for the reinforcement element to be received in the channel 10.

The insertion opening 100 is crossed by the two guide rails 30a, 30b such that these at least partially cover the insertion opening 100. In further embodiments, it is also possible for only one guide rail 30a, 30b to (partially) cover the insertion opening 100.

In the present case, the delimiting wall 101 of the channel is arched away from the main plane of the door module T, and thus also away from the outer side of the module carrier 1, along the vehicle transverse axis y.

In the channel 10, there are furthermore arranged two connecting interfaces 102 which serve for the fixing of the module carrier 1 to the reinforcement element 2. When the module carrier 1 is fixed in the intended manner to the door structure 5, the connecting interfaces 102 of the module carrier 1 are superposed on the connecting interfaces 21 of the reinforcement element 2.

Since the insertion opening 100 of the channel 10 is at least partially covered by at least one guide rail 30a, 30b, it is in the present case made possible for the reinforcement element 2 to be received in the channel 10 by virtue of the fact that the organic sheet of the module carrier 1 of the door module T has an elastically deformable bending region 11. In the embodiment illustrated here, the bending region 11 is formed in the channel 10. The delimiting wall 101 comprises the bending region 11. In further embodiments, the bending region 100 may also be arranged outside the channel 10, in particular below the channel 10.

The bending region 11 extends (over virtually the entire extent of the module carrier 1) along the vehicle longitudinal axis x. The bending region 11 extends in this case at least over the entire extent of the channel 10 along the vehicle longitudinal axis x.

The bending region 11 defines two further regions 12, 13 in the organic sheet of the module carrier 1. Along the vehicle vertical axis z, one region 12 is situated above the bending region 11, and the other region 13, which in the exemplary embodiment is several times larger than the said one region 12, is situated below the bending region 11.

The bending region 11 enables said one region 12 of the organic sheet of the module carrier 1 to bend away from the guide rails 30a, 30b counter to the vehicle transverse axis y. In this way, the insertion opening 100 of the channel 10 can be at least partially opened up in order for the reinforcement element 2 to be received in the channel 10. This will be discussed once again in detail in conjunction with FIGS. 3A to 3C and FIG. 4.

Furthermore, thermoplastics molded-on portions 8 are arranged on the module carrier 1. The molded-on portions 8 may for example at least partially fill apertures in the module carrier 1. The apertures and the associated molded-on portions 8 in this case define interfaces for the fixing of functional elements. This will be discussed in more detail below on the basis of specific molded-on portions, which are assigned the reference designations 81 to 89 as more precise renderings of the general reference designation "8". This is also illustrated by way of example for some reference designations in the figures.

Here, the expressions "thermoplastics molded-on portion" and "thermoplastics encapsulation" are intended to indicate in each case that the corresponding molded-on portion or encapsulation is produced from a thermoplastics material, in particular a thermoplastics polymer. Here, said material may differ from the material of the organic sheet. In the present case, for this purpose, the expressions "molded-on portion" and "encapsulation" are also used without the addition of "thermoplastics".

For example, a molded-on portion 88 for the fixing of a loudspeaker can be seen in the lower, front region of the module carrier 1. Arranged centrally in the front region of the module carrier 1 are molded-on portions 86 which are designed for the fixing of a door control unit. A further molded-on portion 87 for the fixing of a door pull-closed handle is provided partially between the guide rails 30a, 30b, behind the window regulator drive 31.

FIGS. 3A to 3C illustrate how the reinforcement element 2 is connected to the door module T and, for this purpose, is inserted into the channel 10 of the module carrier 1. The figures show, in cross section, the door module T from FIGS. 1B and 2 and the reinforcement element 2 in the form of a tube 20, which reinforcement element extends along the vehicle longitudinal axis x. The cross section has been selected so as to lie along the vehicle longitudinal axis x such that the module carrier 1 is sectioned in the region of the front guide rail 30a, such that the following statements relating to FIGS. 3A to 3C apply in particular to said (front) guide rail 30a, but correspondingly also to the other (rear) guide rail 30b.

FIG. 3A shows a situation before the reinforcement element 2 is received in the channel 10, FIG. 3B shows a situation as the reinforcement element 2 is received in the channel 10, and FIG. 3C shows a situation after the reinforcement element 2 has been successfully received in the channel 10. In all three figures, the vehicle longitudinal axis x extends out of the plane of the drawing; that is to say, the inner side of the door module T is arranged on the left in the plane of the drawing, and the outer side of the door module T is arranged on the right in the plane of the drawing.

In FIG. 3A, the door module T is positioned along the vehicle vertical axis z relative to the reinforcement element 2 such that the head 300a of the guide rail 30a is situated below the reinforcement element 2. Along the vehicle transverse axis y, the door module T is positioned such that the seal element 14 of the module carrier 1 bears laterally against the reinforcement element 2. The seal element 14 is in contact with the inner side of the reinforcement element 2.

A gap 4 is formed between the head 300a of the guide rail 30a and the seal element 14. Here, the extent of the gap 4 is smaller than the extent of the reinforcement element 2. Therefore, the reinforcement element 2 cannot be inserted through the gap 4 into the insertion opening 100 of the channel 10. To nevertheless enable the reinforcement element 2 to be received in the channel 10, it must firstly be made possible for the reinforcement element 2 to be inserted into the insertion opening 100 through the gap 4. This may be realized for example by virtue of the gap 4 being widened.

A widening of the gap 4 can be achieved in that a force is exerted substantially along the vehicle transverse axis y on said one region 12 above the bending region 11. For example, the force may act on the module carrier 1 in the region of the seal element 14. Under the action of such a force, the gap 4 can be widened owing to the elastic deformability of the bending region 11. Specifically, said one region 12, above the bending region 11, and thus also in particular the channel 10 are bent away from the guide rail 30a under the action of the force.

The required force can be exerted on the module carrier 1 by virtue of the door module T firstly being displaced along the vehicle transverse axis y. As a result of this, the reinforcement element 2 presses against the seal element 14. Superposed on said movement is a displacement of the door module T along the vehicle vertical axis z, until the head 300a of the guide rail 30a comes into contact with the tube 20.

Owing to the movement along the vehicle vertical axis z, the seal element 14 slides along the reinforcement element 2. At the same time, the guide rail 30a moves at least partially away from the module carrier 1 along the vehicle transverse axis y, because at least the movement of said one region 12 of the module carrier 1 along said direction is prevented by the reinforcement element 2.

Therefore, during said movement, owing to the elastically deformable bending region 11, the channel 10 is at least partially bent away from the guide rail 30a, and the gap 4 is widened. The bending-away is continued until the gap 4 has widened to an extent sufficient for the reinforcement element 2 to be inserted into the insertion opening 100 between the module carrier 1 and the guide rail 30a. As soon as the gap 4 has been widened to an extent sufficient that the reinforcement element 2 can be inserted into the insertion opening 100, the door module T is displaced further upward along the vehicle vertical axis z. This situation is illustrated in FIG. 3B.

The displacement of the door module T along the vehicle vertical axis z is continued until the reinforcement element 2 is received in the channel 10. Since the bending region 11 is of resiliently elastic form, said one region 12, above the bending region 11, returns into its initial position again after the external action of force is withdrawn.

After the action of force has been withdrawn, the gap 4 decreases in size again, for example to such an extent that it assumes its original extent. The reinforcement element 2 is thus enclosed between the delimiting wall 101 and the guide rail 30a. This is illustrated in FIG. 3C.

In one refinement, the module carrier 1 may be connected, by means of the connecting interfaces 102 of said module carrier, to the reinforcement element 2 received in the channel 10, by means of the connecting interfaces 21 of said reinforcement element.

Figure 4:
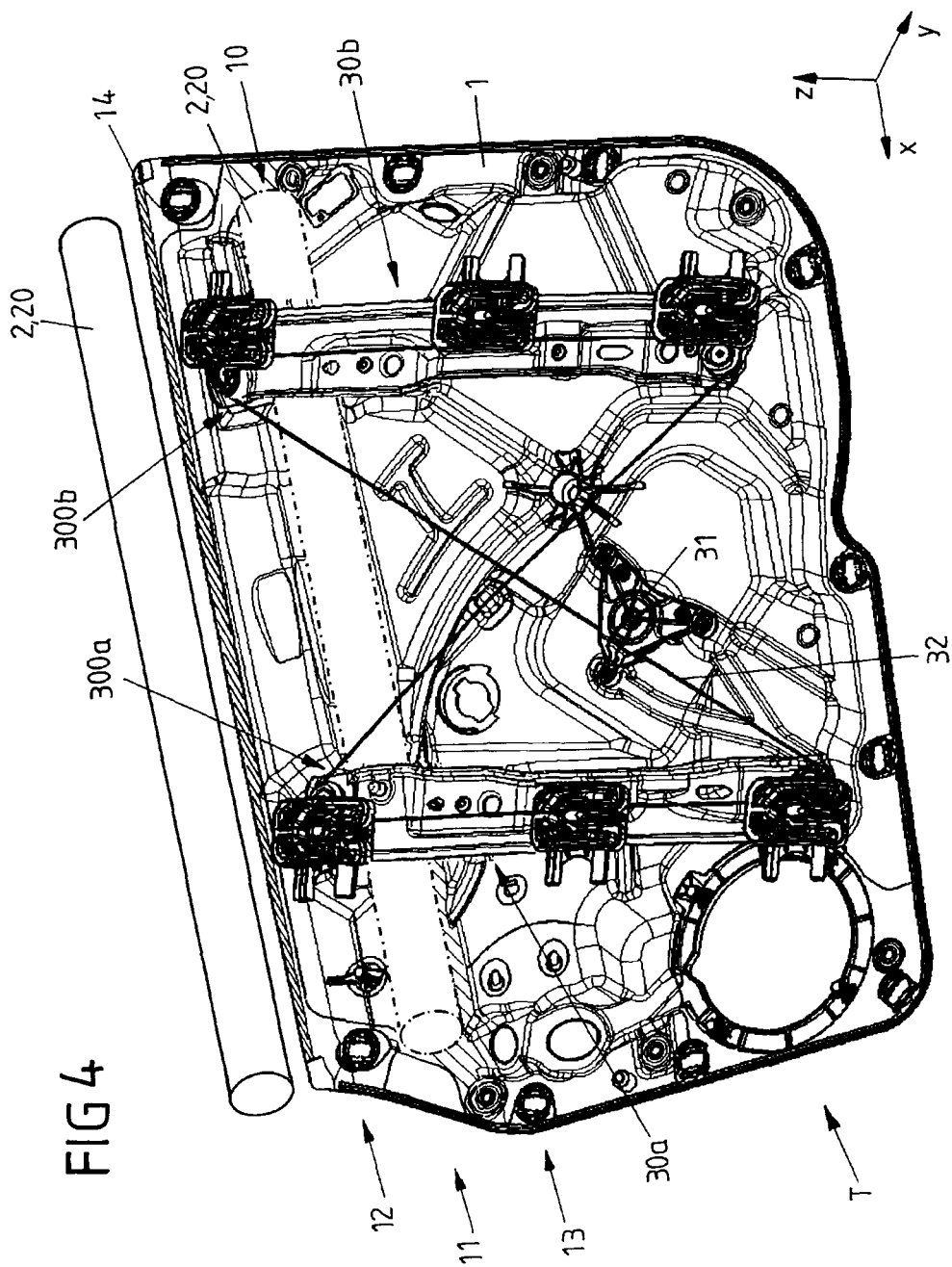
FIG. 4 shows the outer side of the door module as per FIG. 2 and additionally the reinforcement element from FIGS. 3A to 3C before and after it is received in the channel.

FIG. 4 illustrates the outer side of the door module T, correspondingly to FIGS. 1B and 2, and the reinforcement element 2 in the form of a tube 20. The reinforcement element 2 is in this case diagrammatically indicated both before it has been received in the channel 10 and after it has been received in the channel 10. Before being received in the channel 10, the reinforcement element 2 is arranged, along the vehicle vertical axis z, above the door module T, as illustrated by solid lines. This corresponds to a situation as shown in FIG. 3A.

The state after the reinforcement element 2 has been received in the channel 10 is shown by virtue of the reinforcement element 2 being illustrated by dashed lines. This corresponds approximately to the situation illustrated in FIG. 3C. After the reinforcement element 2 has been received in the channel 10, said reinforcement element is, in the channel 10, crossed on the outer side of the door module T by the two guide rails 30a and 30b and by the flexible traction mechanism 32. The two heads 300a and 300b of the guide rails 30a and 30b are in this case arranged, along the vehicle vertical axis z, above the reinforcement element 2.

Figure 4C:
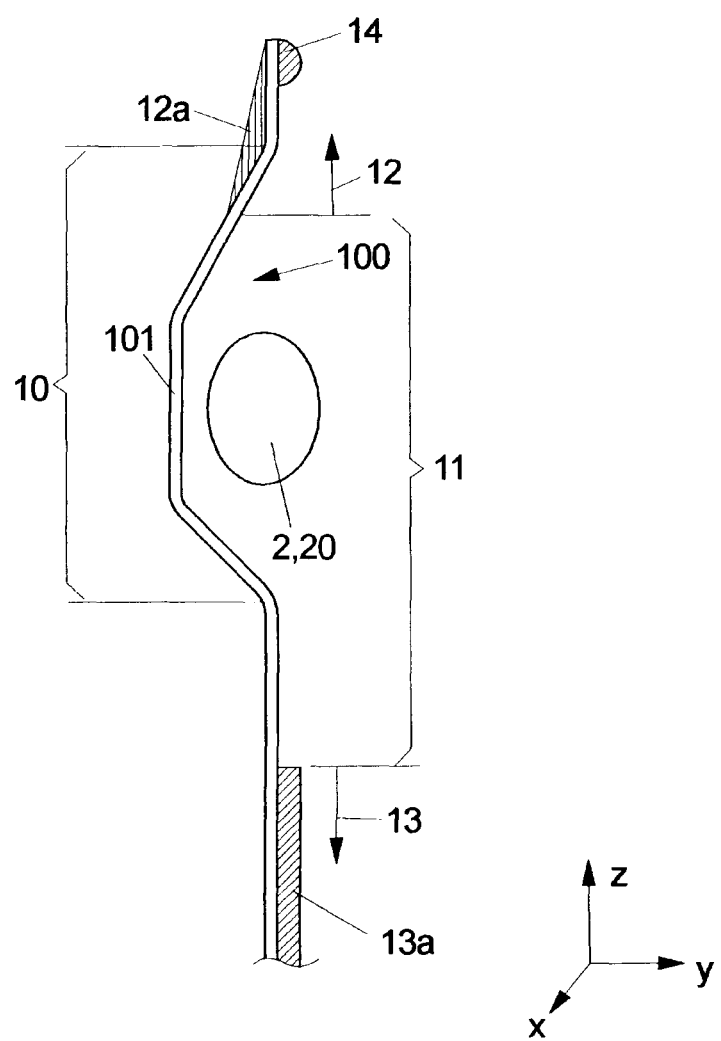

FIGS. 4A to 4C illustrate further exemplary embodiments of a module carrier 1, in particular of the bending region 11, which illustrate modifications of the exemplary embodiment from FIGS. 1A to 4. By contrast, the following FIGS. 5A to 10 relate again to the exemplary embodiment of FIGS. 1A to 4.

FIG. 4A illustrates a detail of a further exemplary embodiment of a module carrier 1 in a perspective view. The illustrated detail of the module carrier 1 shows the outer side of the module carrier 1 and includes the channel 10. In the exemplary embodiment illustrated here, a longitudinally extending reinforcement strip 103 is arranged on the channel 10. Said reinforcement strip runs along the direction of extent of the channel 10.

The reinforcement strip 103 may, for example, be formed as a molded-on portion, in particular with fiber reinforcement. Here, the reinforcement strip 103 may be connected in cohesive and/or positively locking fashion to the organic sheet of the module carrier 1. The reinforcement strip 103 may also be formed as a material thickening of the organic sheet in the channel 10. In the exemplary embodiment illustrated here, the reinforcement strip 103 comprises connecting interfaces 102 for the reinforcement element 2, which reinforcement element can be connected by means of its connecting interfaces 21 to the connecting interfaces 102 of the reinforcement strip 103.

FIG. 4B shows, in a cross section (perpendicular to the vehicle longitudinal axis x), an embodiment of a module carrier 1 with reinforcement strip 103 arranged on the channel 10. The insertion opening 100, arranged on the outer side of the module carrier 1, of the channel 10 is in this case situated on the right-hand side of the image. The (tubular) reinforcement element 2 is received in the channel 10. The reinforcement element 2 is, by means of its connecting interfaces 21 and the connecting interfaces 102 of the reinforcement strip 103, connected to the reinforcement strip 103 by fastening means 22.

In the exemplary embodiment, the elastically deformable bending region 11 of the module carrier 1 has two elastically deformable bending subregions 11a and 11b, which are separated from one another by the reinforcement strip 103. The first bending subregion 11a is arranged, along the vehicle vertical axis z, above the reinforcement strip 103. The first bending subregion 11a adjoins the reinforcement strip 103, and comprises the organic sheet of the module carrier 1 as far as a seal element 14. Here, the seal element 14 is arranged at the outer edge of the module carrier 1, on the outer side thereof. The second bending subregion 11b is arranged, along the vehicle vertical axis z, below the reinforcement strip 103. Said second bending subregion comprises the organic sheet of the module carrier 1 as far as a first stiffening region 13a.

The first stiffening region 13a extends, on the inner side of the module carrier 1, at least partially into that region of the organic sheet of the module carrier which forms the channel 10. The first stiffening region 13a is formed as a stiffening rib which connects the region below the channel 10 to the region of the channel 10. The first stiffening region 13a may for example be a molded-on portion. It produces a protective region for functional elements 13b which are fixed to the module carrier and which are situated, along the vehicle vertical axis z, below the stiffening region 13a.

The two bending subregions 11a and 11b consequently comprise subregions of the delimiting wall 101 of the channel 10. Here, however, in particular owing to stiffening elements such as the first stiffening region 13a and the reinforcement strip 103, not the entire delimiting wall 101 of the channel 10 is formed as a bending region 11.

The bending-away and/or bending-open of the channel 10 with regard to a functional element which is not illustrated here is made possible in particular by means of the elastically deformable bending subregions 11a and 11b. Here, the amplitude of the deflection of the module carrier 1 in relation to its initial position can be co-determined by the elasticity of the two bending subregions 11a and 11b. The elasticities of the two bending subregions 11a and 11b may differ.

FIG. 4C illustrates a further embodiment of a module carrier 1, in turn in a cross section perpendicular to the vehicle longitudinal axis x. In this embodiment, no reinforcement strip 103 is arranged in the channel 10.

Via the insertion opening 100 of the channel 10, the reinforcement element 2, 20, which is of tubular form, has been received in the channel 10. A second stiffening region 12a extends into the region of the channel 10. The second stiffening region 12a is formed as a stiffening rib on the inner side of the module carrier 1 and in the present case extends, along the vehicle vertical axis z, into the region of the channel 10 from above. The stiffening region 12a connects a region of the organic sheet above the channel 10 to the region of the channel 10.

On the outer side of the module carrier 1, the seal element 14 is arranged on the organic sheet of the module carrier 1, above the channel 10 along the vehicle vertical axis z.

Furthermore, the first stiffening region 13a is arranged on the organic sheet of the module carrier 1 on the outer side of the module carrier 1. The first stiffening region 13a is in this case spaced apart from the region of the channel 10 along the vehicle vertical axis z.

In this arrangement, the elastically deformable bending region 11 encompasses virtually the entirety of that region of the organic sheet of the module carrier 1 which defines the channel 10, aside from a small region at the top side of the channel 10, in which the second stiffening region 12a is arranged on the organic sheet of the module carrier 1.

The bending region 11 additionally comprises a region of the organic sheet of the module carrier 1 which adjoins the channel 10 below the latter along the vehicle vertical axis z and which extends as far as the first stiffening region 13a. The bending region 11 is thus delimited by the first and second stiffening regions 13a and 12a. In this case, too, the bending region 11 may have multiple bending subregions which adjoin one another and which differ from one another (merely) by having different elasticities.

Figure 5B:
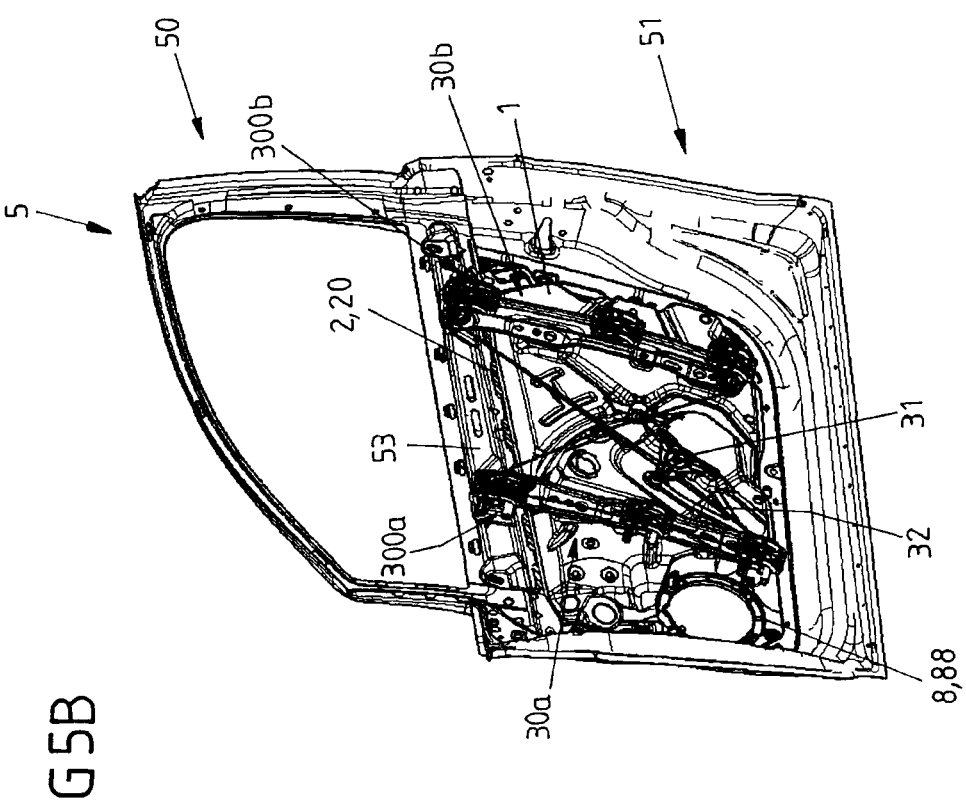
FIG. 5B shows the outer side of the arrangement from FIG. 5A with additional functional elements fixed to the module carrier, in a view as per FIG. 1B.

FIGS. 5A and 5B illustrate once again the door module T and the door structure 5, wherein the door module T is fixed to the door structure 5 and thus conceals the aperture A. FIG. 5A illustrates the inner side of the door structure 5 and of the door module T, analogously to FIG. 1A. The illustration in FIG. 5B is the illustration of the outer side of the door structure 5 and of the door module T.

In the assembled state, on the inner side, the breast delimitation 53 and the reinforcement element 2 are not visible, because they are completely concealed by the door module T. By contrast, on the outer side, the breast delimitation 53 and the lower edge of the reinforcement element 2 are visible. In the assembled state, the two heads 300a and 300b of the guide rails 30a and 30b are fixed to the breast delimitation 53.

FIGS. 6A and 6B illustrate the module carrier 1 of the door module T on an enlarged scale for the purposes of illustrating further details. The inner side is shown in FIG. 6A, and the outer side is shown in FIG. 6B. In particular, a thermoplastics encapsulation 7 and thermoplastics molded-on portions 8, which may also comprise thermoplastics through-moldings, are highlighted by hatching. The encapsulation 7 is indicated by an obliquely running hatching, and, in cross section, encompasses or engages around the edge of the module carrier 1 at least in sections. The molded-on portions 8 are indicated by hatching with a checked pattern. Here, the expression "thermoplastics molded-on portion or encapsulation" indicates that the corresponding molded-on portion or encapsulation is produced by injection molding from a thermoplastics material, which can thus be brought into a moldable (that is to say viscous) state for the injection molding process.

The molded-on portions 8 may be applied directly to the organic sheet, may at least partially fill apertures formed in the organic sheet, and/or may be formed as through-moldings of the organic sheet.

In the case of an encapsulation 7, a part of the organic sheet of the module carrier 1, in particular at the outer edge thereof, is, in cross section, at least partially encompassed by a thermoplastics material. In the case of a molded-on portion 8, a thermoplastics material is applied to the organic sheet of the module carrier 1, for example in order to at least partially fill apertures of the organic sheet. In the case of a through-molding as a special type of molded-on portion, thermoplastics material is molded through the organic sheet of the module carrier 1. For the molding process, use is made of a thermoplastics polymer, such as for example polypropylene.

The apertures in the organic sheet of the module carrier 1 may for example be depressions in the organic sheet or may be openings which extend through the organic sheet. The molded-on portions 8 may completely or else only partially fill the apertures. Furthermore, the molded-on portions 8 may define structures which protrude from the main plane of the module carrier 1.

For example, by means of the molded-on portions 8, it is possible for structures to be produced with high precision. It is also possible by means of the molded-on portions 8 to generate an excess of material which is at least partially removed again (by means of a tool). In this way, predefined structures can be formed on the organic sheet of the module carrier 1.

The molded-on portions 8 may define not only interfaces for functional elements but for example also regions with increased stiffness (in relation to adjacent regions). In further embodiments, the molded-on portions may define delimitations, such as walls, seals or pegs (for example for positioning purposes), fixing regions and/or regions with increased material quantity (for receiving fastening means).

As per FIGS. 6A and 6B, the encapsulation 7 engages, in cross section, around the outer edge 15 of the organic sheet of the module carrier 1. At the same time, the central region of the module carrier 1 is in this case (fully) surrounded in ring-shaped fashion by the encapsulation 7. In a design variant which is illustrated here, the encapsulation 7 may define a seal edge. When the door module T has been installed in the intended manner on the door structure 5, the seal edge ensures that the outer edge 15 of the organic sheet of the module carrier 1 terminates in sealing fashion with the door structure 5.

The attachment region 17, on which the window regulator drive 31 can be arranged, is formed on the inner side of the module carrier 1. Here, a sound-insulating wall 16 is arranged in the attachment region 17. The sound-insulating wall 16 is formed by a molded-on portion. When the window regulator drive 31 has been fixed in the intended manner in the attachment region 17, at least one drive motor 310 is surrounded by the sound-insulating wall 16.

In a further embodiment, the sound-insulating wall 16 may be of lamellar form, for example for the purposes of accommodating an insulating material in the sound-insulating wall 16. The attachment region 17 may be covered by means of a cover. If a sound-insulating wall 16 is provided, the cover may be applied to the sound-insulating wall 16. The sound-insulating wall 16 serves for damping drive noises of the drive motor 310.

Furthermore, a stiffening region 9 is situated on the inner side of the module carrier 1, within the attachment region 17. Said stiffening region is formed by a formed-out portion of the organic sheet of the module carrier 1. In a further embodiment, said stiffening region may also be formed by a molded-on portion. In particular, on the attachment region 17, there is formed an opening 311 for a drive shaft of the motor vehicle window regulator 3, which extends through the module carrier 1.

A multiplicity of molded-on portions 89*a* is arranged on the module carrier 1 along the entire edge region of the module carrier 1. Said molded-on portions 89*a* serve for the fixing of the door module T to the door structure 5. In the embodiment illustrated here, said molded-on portions are bayonet connection points. Furthermore, a multiplicity of molded-on portions 89*b* is arranged in the edge region of the module carrier 1, which molded-on portions are designed for the fixing of a door inner lining to the module carrier 1. Here, the molded-on portions 89*a* and 89*b* each at least partially fill apertures, in the form of openings, in the organic sheet of the module carrier 1.

Furthermore, two molded-on portions 8 are illustrated which run substantially vertically along the vehicle vertical axis z and which are formed, for the fixing of the guide rails 30*a* and 30*b*, on the outer side of the module carrier 1. On the inner side of the module carrier 1, the substantially vertically running molded-on portions 8 have in each case three screw bosses 83. These define an excess of material on the module carrier 1, into which fastening means, such as for example screws, can be inserted from the outer side of the module carrier 1.

On the outer side of the module carrier 1 there are formed, correspondingly to the (six) screw bosses 83, (six) molded-on portions 84 for the fixing of the guide rails 30*a* and 30*b*. The molded-on portions 83 and 84 are connected through the module carrier 1. Between the molded-on portions 83, 84 for the fixing of the guide rails 30*a* and 30*b*, and above the sound-insulating wall 16 along the vehicle vertical axis z, there is situated a molded-on portion 89*c* which is designed for the fixing of an airbag sensor to the module carrier 1. Said molded-on portion 89*c* partially fills an aperture in the organic sheet of the module carrier 1, and in so doing itself defines an opening which is smaller than the aperture in the module carrier 1.

As has already been mentioned in conjunction with FIG. 2, (three) molded-on portions 86 for the fixing of the door control unit to the module carrier 1 are arranged in the front region of the door module T and approximately in the center along the vehicle vertical axis z. Said molded-on portions can be seen both from the inner side and from the outer side of the module carrier 1.

The molded-on portion 88 for the fixing of a loudspeaker to the module carrier 1 has likewise been mentioned in conjunction with FIG. 2. Said molded-on portion is formed in the front, lower corner of the door module 1. Here, said molded-on portion is of substantially circular form, with an aperture approximately in the center, for receiving a loudspeaker body. Further details of said molded-on portion 88 will be discussed with regard to FIGS. 8A and 8B, and a molded-on portion 87 for the fixing of a door pull-closed handle will be described in detail with regard to FIGS. 7A and 7B.

In the rear region along the vehicle longitudinal axis x, and in the lower region along the vehicle vertical axis z, of the organic sheet of the module carrier 1, a stiffening rib 82 is arranged on the inner side of the module carrier 1, which stiffening rib extends substantially along the vehicle longitudinal axis x. The stiffening rib 82 is formed by a molded-on portion which is arranged directly on the organic sheet of the module carrier 1. The stiffening rib 82 connects a molded-on portion 89*a*, for the fixing of the door module T to the door structure 5, to the encapsulation 7 of the outer edge 15 of the organic sheet of the module carrier 1. The stiffening rib 82 increases the strength/stiffness of the outer edge 15.

On the outer side of the module carrier 1, a molded-on portion 85 is furthermore arranged in the attachment region 17, which molded-on portion is designed for the fixing of the window regulator drive 31 to the module carrier 1. Situated in the center of the molded-on portion 85 is the opening 311 through which the drive shaft of the motor vehicle window regulator 3 can extend. (Three) webs extend in stellate fashion from the circular opening 311. Said webs, at their ends, comprise connecting interfaces 312a, 312b, 312c for the fixing of the window regulator drive 31 to the module carrier 1.

Furthermore, on the outer side of the module carrier 1, there are situated two molded-on portions 89d which are designed for the positioning of the door module T on the door structure 5. In this embodiment, the molded-on portions 89d are in the form of pegs. The first peg is arranged on the organic sheet of the module carrier 1 centrally along the vehicle vertical axis z and at the front end of the module carrier 1 along the vehicle longitudinal axis x, adjacent to the outer edge 15. The second peg is arranged slightly lower than the first peg along the vehicle vertical axis z and is arranged at the other end of the module carrier 1, the rear end, along the vehicle longitudinal axis x.

FIGS. 7A and 7B illustrate, on an enlarged scale, a region of the module carrier 1 which comprises a molded-on portion 87 for the fixing of a door pull-closed handle. FIG. 7A shows the outer side, and FIG. 7B shows the inner side, of said region of the module carrier 1. Said molded-on portion 87 has a radiating rib structure with a multiplicity of ribs 81 which extend from a cylindrical center of the outer side of the module carrier 1. Here, two of the ribs 81 are formed as through-extending ribs 81a. By contrast to the other ribs, these are arranged both on the outer side and on the inner side of the module carrier 1.

The through-extending ribs 81a are formed by molded-on portions in the form of in each case one through-molding of the organic sheet of the module carrier 1. However, for this purpose, no openings have been formed in the organic sheet prior to the molding process. Rather, the openings required have been created by the thermoplastics material itself in the course of the through-molding of the organic sheet. In another variant, it is possible for apertures to firstly be formed in the organic sheet, through which apertures ribs 81a are led through the organic sheet. As a result of the arrangement of ribs 81a both on the outer side and on the inner side of the module carrier 1, the stiffness and stability of the molded-on portion 87 for the door pull-closed handle can be increased.

FIGS. 8A and 8B show, on an enlarged scale, a region of the module carrier 1 which comprises the molded-on portion 88 for the fixing of a loudspeaker. FIG. 8A shows the inner side, and FIG. 8B shows the outer side, of the module carrier 1. The molded-on portion 88 is adjoined by a wall 6 which is formed by a stamped protuberance of the organic sheet of the module carrier 1. The wall 6 thus defines an aperture in the organic sheet of the module carrier 1, which aperture is at least partially filled with said molded-on portion 88.

Here, the wall 6 also (directly) adjoins an interface for the fixing of the front guide rail 30a. The interface is defined by an aperture of the organic sheet, which aperture is at least partially filled with a molded-on portion 8. On the inner side of the module carrier 1, said molded-on portion 8 defines the screw boss 83, and on the outer side, said molded-on portion 8 defines the associated molded-on portion 84 for the fixing of the guide rail 30a.

The wall 6 is furthermore designed so as to extend at an angle out of the main plane of the module carrier 1, in this case away from the molded-on portion 88 for the fixing of a loudspeaker. The angle between the wall 6 and the main plane of the module carrier 1 amounts to between 100° and 140°, and may in particular amount to substantially 120°. The wall 6 consequently not only serves for the fixing of a loudspeaker but also supports the interface for the fixing of the guide rail 30a.

FIG. 9A illustrates the inner side of the door module T, wherein the window regulator drive 31 is fixed to the module carrier 1 in the attachment region 17. Furthermore, said region of the module carrier 1 is illustrated on an enlarged scale in FIG. 9B, specifically without the window regulator drive 31, for the purposes of illustrating further details. The attachment region 17 is surrounded by the stamped protuberance 18 of the organic sheet of the module carrier 1. The sound-insulating wall 16, which surrounds the window regulator drive 31, is mounted onto the attachment region 17. The sound-insulating wall 16 serves for damping drive noises of the window regulator drive 31.

A stiffening region 9 extends substantially, within the attachment region 17, along the direction of extent s of the flexible traction mechanism 32. Here, the stiffening region 9 connects two oppositely situated sections of the stamped protuberance 18. The stiffening region 9 is furthermore designed, with regard to its contour, so as to run at least partially around the opening 311.

The stiffening region 9 defines two planes 170, 171 in the attachment region 17. The first plane 170 is, along the vehicle transverse axis y, formed at a lower level in the organic sheet of the module carrier 1, that is to say further remote from the viewer, then the second plane 171. The first plane 170 has a spacing to the second plane 171 along the vehicle transverse axis y. The two planes 170, 171 are thus offset with respect to one another.

When the window regulator drive 31 is fixed in the intended manner to the organic sheet of the module carrier 1, or more specifically in the attachment region 17, the drive shaft of the window regulator drive 31 extends through the organic sheet through the opening 311 which is arranged in the region of the second plane 171. The drive motor 310 of the window regulator drive 31 is arranged in the region of the first plane 170. The drive motor 310 is in this case situated slightly above the surface of the organic sheet of the module carrier 1. It is in a type of (fictitious) "floating state".

The (three) connecting interfaces 312a, 312b, 312c for the fixing of the window regulator drive 31 to the module carrier 1 are arranged in the attachment region 17 such that two connecting interfaces 312a, 312b are arranged on the first plane 170. The third connecting interfaces 312c is arranged on the second plane 171.

The stiffening region 9 defines a tilt axis k. The tilt axis k extends substantially along the local direction of extent s of the flexible traction mechanism 32, more specifically along the direction of extent s of a traction mechanism section proceeding from the window regulator drive 31. Specifically, by means of the stiffening region 9, tilting of the window regulator drive 31 along the tilt axis k is impeded compared with tilting about the tilt axis k. The window regulator drive 31 can thus perform tilting about the tilt axis k, and oscillations of the drive motor 31 about the tilt axis k are possible. In this way, drive noises of the window regulator drive 31 can be reduced. At the same time, the transmission of force in the flexible traction mechanism 32 is assisted by means of the stiffening region 9.

The amplitude of the vibrations is determined inter alia by the material characteristics of the window regulator drive 31, of the connecting interfaces 312a, 312b, 312c and of the stiffening region 9 and by the arrangement of the connecting interfaces 312a, 312b, 312c and of the drive motor 310 relative to the stiffening region 9.

The stiffening region 9 may be continued outside the attachment region 17. For example, in the exemplary embodiment, the stiffening region 9 is continued along the direction of extent s of the flexible traction mechanism 32 on both sides of the attachment region 17.

On the lower side of the attachment region 17, the stiffening region 9 is continued such that it forms a first limb 91 of a Y-shaped stiffening region 9. A base 90 of the Y-shaped stiffening region 9 extends substantially along the local direction of extent s of the flexible traction mechanism 32. The base 90 is arranged entirely outside the attachment region 17. A second limb 92 of the stiffening region 9 is arranged partially outside the attachment region 17 and partially within the attachment region 17. Here, the second limb 92 is situated closer than the first limb 91 to the front side of the module carrier 1 along the vehicle longitudinal axis x.

FIG. 10 illustrates the door module T from FIG. 9A once again, but without a sound-insulating wall 16 in the attachment region 17.

LIST OF REFERENCE DESIGNATIONS

1 Module carrier
10 Channel
100 Insertion opening
101 Delimiting wall
102 Connecting interface for a reinforcement element
103 Reinforcement strip
11 Bending region
11a First bending subregion
11b Second bending subregion
12 Region above the bending region in vehicle vertical axis (z)
12a Second stiffening region
13 Region below the bending region in vehicle vertical axis (z)
13a First stiffening region
13b Functional elements fixed to the module carrier
14 Seal element
15 Outer edge of the organic sheet of the module carrier
16 Sound-insulating wall
17 Attachment region
170 1st plane of the attachment region
171 2nd plane of the attachment region
18 Stamped protuberance of the organic sheet of the module carrier
2 Reinforcement element
20 Tube
21 Connecting interface for a module carrier
22 Fastening means
3 Motor vehicle window regulator
30a Front guide rail
30b Rear guide rail
300a Head of the front guide rail
300b Head of the rear guide rail
31 Window regulator drive
310 Drive motor
311 Opening for the drive shaft
312a 1st connecting interface for the window regulator drive
312b 2nd connecting interface for the window regulator drive
312c 3rd connecting interface for the window regulator drive
32 Flexible traction mechanism
4 Gap
5 Door structure
50 Window frame structure
51 Door case
52 Door inner panel
53 Breast delimitation
6 Wall between an interface for the fixing of a loudspeaker and an interface for the fixing of a guide rail
7 Thermoplastics encapsulation
8 Thermoplastics molded-on portion
81 Rib of a radiating rib structure
81a Through-extending rib of a radiating rib structure
82 Stiffening rib
83 Screw boss
84 Thermoplastics molded-on portion for the fixing of a guide rail
85 Thermoplastics molded-on portion for the fixing of a window regulator drive
86 Thermoplastics molded-on portion for the fixing of a door control unit
87 Thermoplastics molded-on portion for the fixing of a door pull-closed handle
88 Thermoplastics molded-on portion for the fixing of a loudspeaker
89a Thermoplastics molded-on portion for the fixing of a door module to a door structure
89b Thermoplastics molded-on portion for the fixing of a door inner lining to a door module
89c Thermoplastics molded-on portion for the fixing of an airbag sensor
89d Thermoplastics molded-on portion for the positioning of the module carrier
9 Stiffening region
90 Base of the stiffening region
91 1st limb of the stiffening region
92 2nd limb of the stiffening region
A Aperture
T Door module
k Tilt axis
s Direction of extent of flexible traction mechanism
x Vehicle longitudinal axis
y Vehicle transverse axis
z Vehicle vertical axis

The invention claimed is:

1. A door module for a motor vehicle door, the door module comprising:
a module carrier which is formed substantially by organic sheet,
an attachment region of the module carrier, which is surrounded by a first stamped protuberance of the organic sheet,
a window regulator drive, arranged in the attachment region, of a motor vehicle window regulator, and
at least one cable extending from the window regulator drive and coupled thereto, which cable extends along the module carrier,
wherein in the attachment region of the module carrier, a longitudinally extending stiffening region is formed as a second stamped protuberance of the organic sheet and which runs along a direction of extent of a section of the cable.

2. The door module as claimed in claim 1, wherein the stiffening region is formed partially from thermoplastics as a portion molded to the organic sheet.

3. The door module as claimed in claim 1, wherein the stiffening region is formed with at least one rib.

4. The door module as claimed in claim 1, wherein the stiffening region runs substantially parallel to the direction of extent of the section of the cable.

5. The door module as claimed in claim 1, wherein the section of the cable is formed by a cable section extending from the window regulator drive.

6. The door module as claimed in claim 1, wherein the stiffening region extends from one side of the stamped protuberance surrounding the attachment region to a second side of the stamped protuberance.

7. The door module as claimed in claim 1, wherein the stiffening region—in relation to an installed state of the door module in the motor vehicle door—separates, within the attachment region, two planes of the module carrier that are spaced from one another along the horizontal vehicle transverse axis.

8. The door module as claimed in claim 7, wherein a drive shaft of the window regulator drive, extending through an opening in the module carrier, is arranged in a region of the first plane of the attachment region, and wherein a drive motor of the window regulator drive is arranged in a region of the second plane of the attachment region.

9. The door module as claimed in claim 1, wherein the stiffening region is adapted at least in sections to a contour of an opening in the module carrier, through which opening a drive shaft of the window regulator drive extends.

10. The door module as claimed in claim 9, wherein the stiffening region extends at least partially around the opening.

11. The door module as claimed in claim 1, wherein the stiffening region extends both inside the attachment region surrounded by the first stamped protuberance of the organic sheet and outside the attachment region.

12. The door module as claimed in claim 11, wherein the stiffening region is formed in a Y-shaped manner, wherein a base of the stiffening region is arranged outside the attachment region and runs along the direction of extent of the section of the cable, and wherein a first limb of the stiffening region extends within the attachment region.

13. The door module as claimed in claim 1, wherein the window regulator drive is connected to the module carrier in the attachment region such that a drive motor of the window regulator drive can oscillate about a tilt axis which extends along the stiffening region.

14. The door module as claimed in claim 1, wherein an encircling sound-insulating wall is mounted on a contour of the attachment region to reduce airborne noise.

15. The door module as claimed in claim 14, wherein the sound-insulating wall is formed in a lamellar manner in order to accommodate an insulating material.

16. The door module as claimed in claim 14, wherein a cover is mounted on the sound-insulating wall.

17. The door module as claimed in claim 1, wherein the stiffening region defines a tilt axis which promotes tilting of the window regulator drive about the tilt axis, at the same time impeding tilting of the window regulator drive along the tilt axis.

18. The door module as claimed in claim 17, wherein oscillations of the window regulator drive about the tilt axis are enabled by the stiffening region in order to reduce drive noises of the window regulator drive.

19. The door module as claimed in claim 17, wherein the tilt axis substantially runs along a direction of extent of the longitudinally extending stiffening region.

* * * * *